United States Patent
Persson

(10) Patent No.: US 10,648,373 B2
(45) Date of Patent: May 12, 2020

(54) DEVICE FOR CONTROLLING AT LEAST ONE VALVE IN AN INTERNAL COMBUSTION ENGINE

(71) Applicant: VOLVO TRUCK CORPORATION, Göteborg (SE)

(72) Inventor: Per Persson, Partille (SE)

(73) Assignee: VOLVO TRUCK CORPORATION, Göteborg (SE)

( * ) Notice: Subject to any disclaimer, the term of this patent is extended or adjusted under 35 U.S.C. 154(b) by 0 days.

(21) Appl. No.: 16/077,645

(22) PCT Filed: Feb. 16, 2016

(86) PCT No.: PCT/EP2016/053281
§ 371 (c)(1),
(2) Date: Aug. 13, 2018

(87) PCT Pub. No.: WO2017/140351
PCT Pub. Date: Aug. 24, 2017

(65) Prior Publication Data
US 2019/0048763 A1    Feb. 14, 2019

(51) Int. Cl.
*F01L 1/18* (2006.01)
*F01L 1/26* (2006.01)
(Continued)

(52) U.S. Cl.
CPC .............. *F01L 1/267* (2013.01); *F01L 1/053* (2013.01); *F01L 1/181* (2013.01); *F01L 1/20* (2013.01);
(Continued)

(58) Field of Classification Search
CPC . F01L 1/3442; F01L 2001/0473; F01L 1/181; F01L 1/267
(Continued)

(56) References Cited

U.S. PATENT DOCUMENTS

| | | |
|---|---|---|
| 5,148,783 A | 9/1992 | Shinkai et al. |
| 5,553,584 A | 9/1996 | Konno |

(Continued)

FOREIGN PATENT DOCUMENTS

| | | |
|---|---|---|
| DE | 10266592 A1 | 6/2004 |
| EP | 1550794 A2 | 7/2005 |
| GB | 2200967 A | 8/1988 |

OTHER PUBLICATIONS

International Search Report (dated Mar. 3, 2017) for corresponding International App. PCT/EP2016/053281.

*Primary Examiner* — Ching Chang
(74) *Attorney, Agent, or Firm* — Venable LLP; Jeffri A. Kaminski

(57) ABSTRACT

A device for actuating at least one valve in an internal combustion engine includes a camshaft arrangement including a hollow outer shaft and an inner shaft, which is concentrically mounted inside of the outer shaft to be pivotable relative to the outer shaft. A first cam lobe is mounted on one of the inner shaft and the outer shaft in a rotationally fixed manner and a second cam lobe is mounted on the other of the inner shaft and the outer shaft in a rotationally fixed manner. The device further includes a rocker arm arrangement including a first primary rocker arm, which is arranged to follow the first cam lobe and arranged to actuate a first valve when it follows the first cam lobe. The rocker arm arrangement further includes an auxiliary rocker arm, which is arranged to follow the second cam lobe. The auxiliary rocker arm is adapted to actuate the first primary rocker arm so that an opening tune of the first valve may be extended by the auxiliary rocker arm following the second cam lobe.

28 Claims, 18 Drawing Sheets

(51) Int. Cl.
- *F01L 1/053* (2006.01)
- *F01L 1/20* (2006.01)
- *F01L 1/344* (2006.01)
- *F01L 13/00* (2006.01)
- *F01L 1/047* (2006.01)
- *F02D 13/02* (2006.01)

(52) U.S. Cl.
CPC ......... *F01L 1/3442* (2013.01); *F01L 13/0047* (2013.01); *F01L 2001/0473* (2013.01); *F01L 2001/34423* (2013.01); *F01L 2105/00* (2013.01); *F01L 2250/04* (2013.01); *F01L 2810/03* (2013.01); *F02D 13/0269* (2013.01); *Y02T 10/142* (2013.01)

(58) Field of Classification Search
USPC .............................. 123/90.16, 90.39, 90.44
See application file for complete search history.

(56) References Cited

U.S. PATENT DOCUMENTS

| | | | |
|---|---|---|---|
| 5,613,469 A | 3/1997 | Rygiel | |
| 6,053,135 A | 4/2000 | Ochiai et al. | |
| 7,565,887 B2* | 7/2009 | Tsuruta | F01L 1/267 |
| | | | 123/90.16 |
| 8,820,281 B2 | 9/2014 | Dietel et al. | |
| 2002/0017252 A1 | 2/2002 | Onoue | |
| 2002/0100441 A1 | 8/2002 | Maeda | |
| 2008/0215228 A1 | 9/2008 | Krebber-Hortmann | |

* cited by examiner

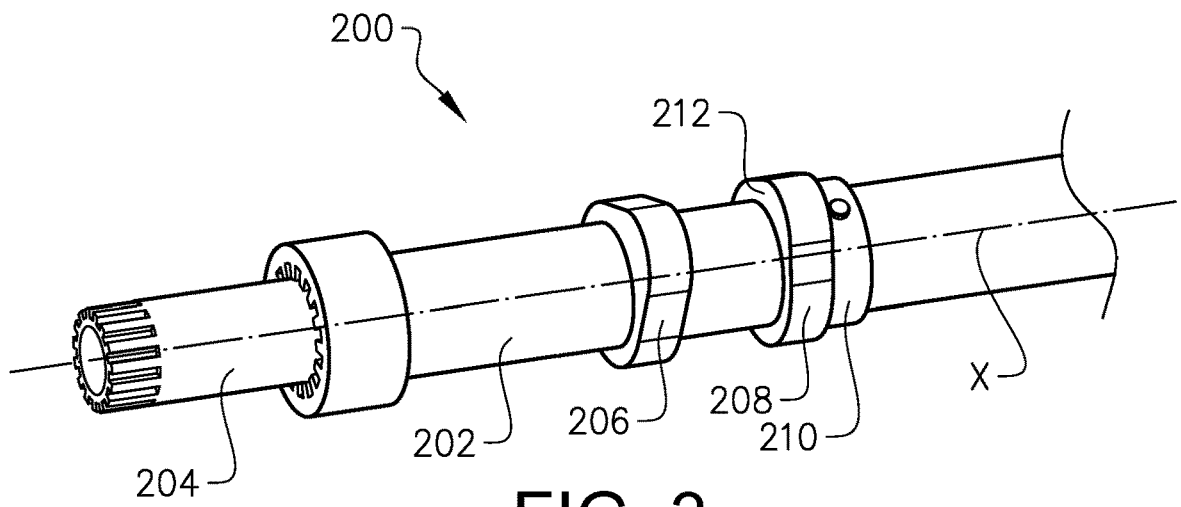
FIG. 3
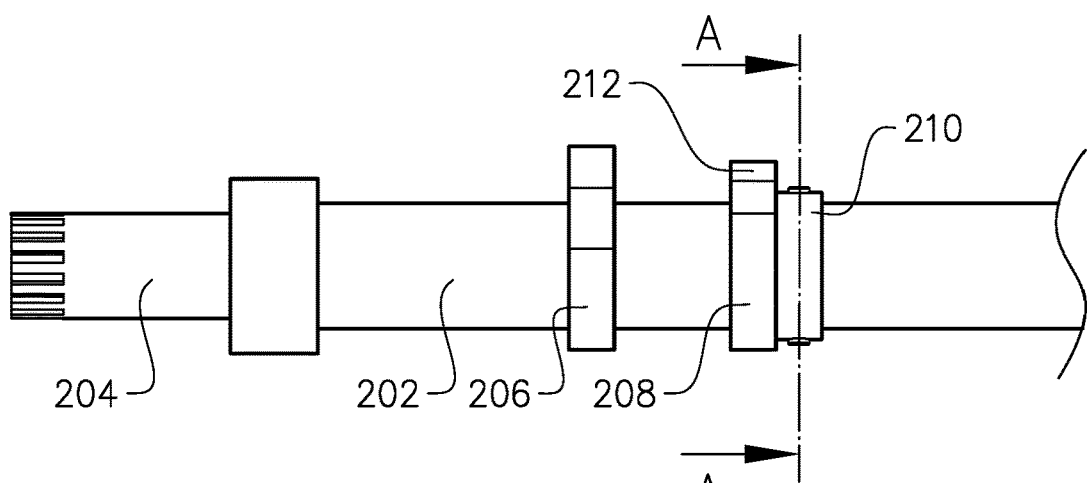
FIG. 4
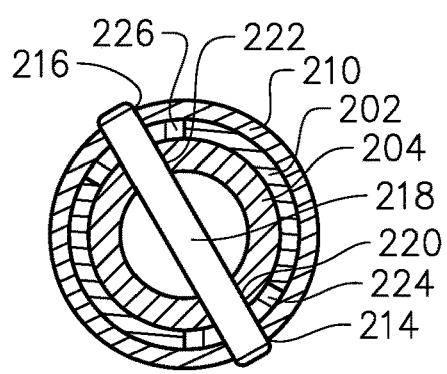
FIG. 5 A-A

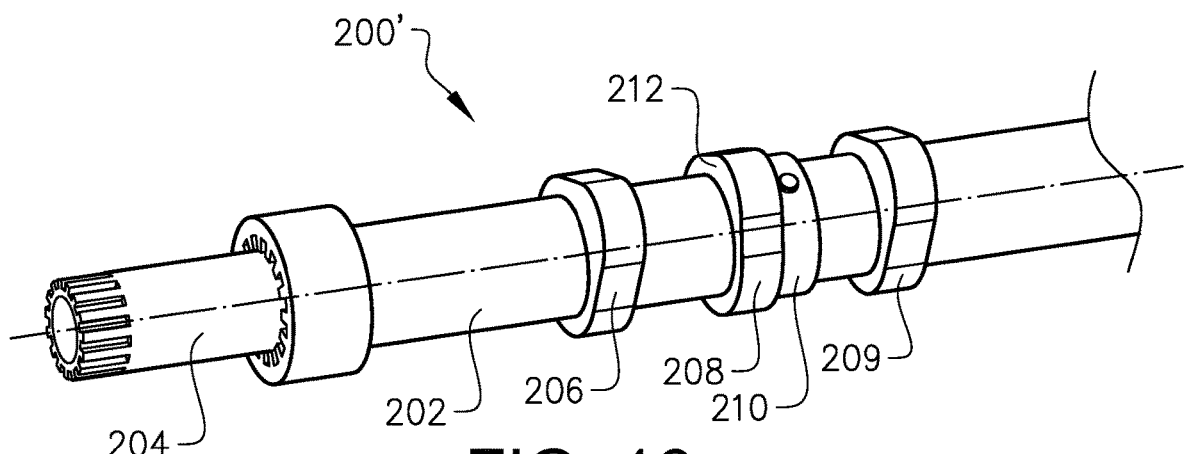
FIG. 16
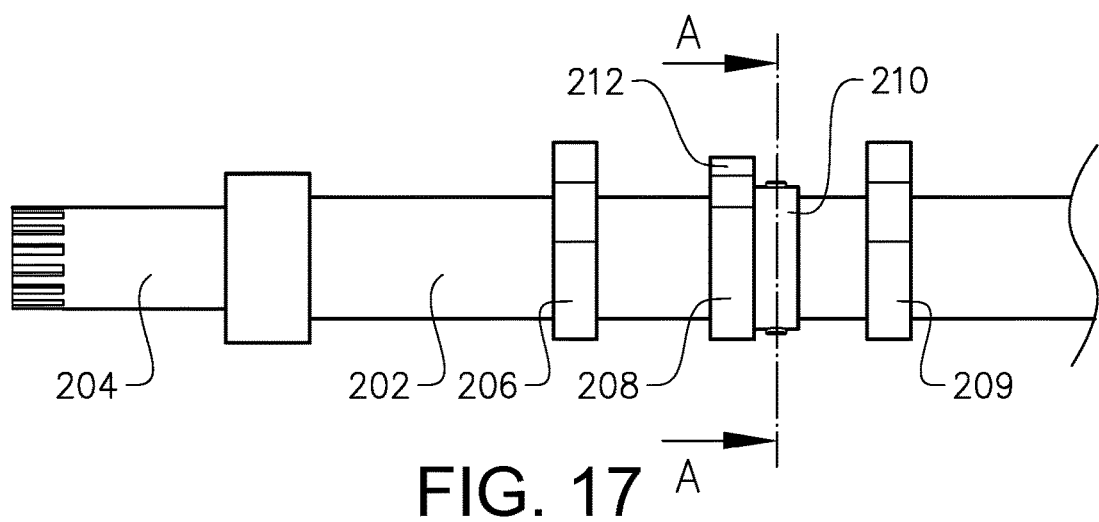
FIG. 17
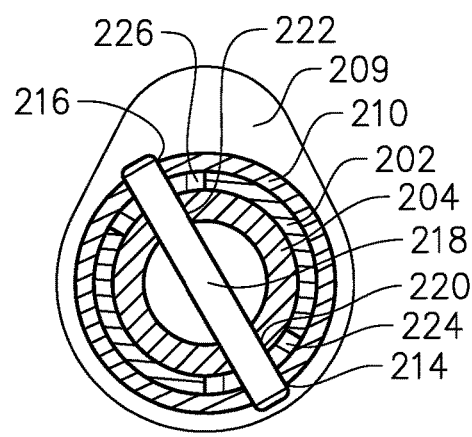
FIG. 18 A-A

DEVICE FOR CONTROLLING AT LEAST ONE VALVE IN AN INTERNAL COMBUSTION ENGINE

BACKGROUND AND SUMMARY

The invention relates to an engine valve actuation device, especially for actuating poppet valves. The engine valve actuation device may be arranged to supply intake gas (air plus maybe EGR) or evacuating exhaust gases from a combustion cylinder.

Internal, combustion engines typically use either a mechanical, electrical, or hydro-mechanical valve actuation system to actuate the engine valves. These systems may include a combination of camshafts, rocker arms and push rods that are driven by the engine's crankshaft rotation. When a camshaft is used to actuate the engine valves, the timing of the valve actuation may be fixed by the size and location of the lobes on the camshaft.

For each 360 degree rotation of the camshaft, the engine completes a full cycle made up of four strokes (i.e., expansion, exhaust, intake, and compression). Both the intake and exhaust valves may be closed, and remain closed, during most of the expansion stroke wherein the piston is traveling away from the cylinder head (i.e., the volume between the cylinder head and the piston head is increasing). During positive power operation, fuel is burned during the expansion stroke and positive power is delivered by the engine. The expansion stroke ends at the bottom dead center point, at which time the piston reverses direction and the exhaust valve may be opened for a main exhaust event. A lobe on the camshaft may be synchronized to open the exhaust valve for the main exhaust event as the piston travels upward and forces combustion gases out of the cylinder. Near the end of the exhaust stroke, another lobe on the camshaft may open the intake valve for the main intake event at which time the piston travels away from the cylinder head. The intake valve closes and the intake stroke ends when the piston is near bottom dead center. Both the intake and exhaust valves are closed as the piston again travels upward for the compression stroke.

The valve actuation system may further provide for variable valve lift duration as function of engine operating conditions such as speed, load, transient versus steady state, cold start versus hot condition, i.e. variable Miller operation, in order to achieve a good trade off between engine fuel efficiency, maximum peak cylinder pressure, gaseous emission, exhaust gas temperature (temperature suitable for emission catalyst system). Variable valve lift duration may be achieved via a camshaft arrangement with concentric camshafts.

U.S. Pat. No. 8,820,281 discloses a camshaft for an internal combustion engine, having a hollow outer shaft and an inner shaft which is concentrically mounted inside the outer shaft to be rotatable about an angle and a multi-part cam element having a first cam section that is mounted on the outer shaft in a rotationally fixed manner and a second cam section that is connected to the inner shaft in a rotationally fixed manner and rotationally mounted on the outer shaft. The two cam sections have different cam contours, the relative movement of the two cam sections in opposite directions allowing the resulting cam contour of the cam element interacting with a cam follower to be changed to adjust the variable valve opening period. The two cam sections have different maximum lifts, the cam top section of the cam section having the smaller maximum lift being substantially formed by an annular sector.

The invention can be applied in heavy-duty vehicles, such as trucks, buses and construction equipment. Although the invention will be described with respect to a truck, the invention is not restricted to this particular vehicle, but may also be used in other vehicles such as passenger cars, buses and construction equipment. Further, the invention will be described with examples to supply intake gas (air plus maybe EGR), but may alternatively be used for evacuating exhaust gases from a combustion cylinder.

It is desirable to provide an engine valve actuation device, which creates conditions for varying a valve lift duration in a robust way.

According to an aspect of the invention, a device for actuating at least one valve in an internal combustion engine comprises
a camshaft arrangement comprising
a hollow outer shaft,
an inner shaft, which is concentrically mounted inside of the outer shaft to be pivotable relative to the outer shaft,
a first cam lobe mounted on one of the inner shaft and the outer shaft in a rotationally fixed manner,
a second cam lobe mounted on the other of the inner shaft and the outer shaft in a rotationally fixed manner,
a rocker arm arrangement comprising
a first primary rocker arm, which is arranged to follow the first cam lobe and arranged to actuate a first valve when it follows the first cam lobe,
characterized in that
the rocker arm arrangement comprises
an auxiliary rocker arm, which is arranged to follow the second cam lobe and that the auxiliary rocker arm is adapted to actuate the first primary rocker arm so that an opening time of the first valve may be extended by the auxiliary rocker arm following the second cam lobe.

This device creates conditions for a variable intake valve lift duration, and especially an extension of a duration of the valve opening time for late closing of the valve, i.e. variable Miller operation. In other words, a delayed closing time may be achieved. According to an alternative, the device may be used for an extension of a duration of the valve opening time via a pre-opening of the valve. In other words, an early opening time may be achieved.

The auxiliary rocker arm and the second cam lobe are adapted for supporting the primary rocker arm and the first cam lobe in the actuation of the first valve. According to one example, the pair of the auxiliary rocker area and the second cam lobe has a supporting function only in the extension of the opening time of the first valve. According to one example, the term "auxiliary" defines that the auxiliary rocker arm does not have any dedicated own valve, but instead is adapted to support in the extension of the opening time of the first valve (and possibly a further valve). The arrangement of the auxiliary rocker arm and the second cam lobe creates conditions for adapting the device for different needs in different engines by different designs of the profile of the second cam lobe.

The camshaft arrangement may be called concentric camshafts. According to one example, a cam phaser arrangement is adapted to pivot the inner shaft in relation to the outer shaft to different relative positions in order to vary the relative positions of the first cam lobe and the second cam lobe.

According to one example, the second cam lobe is arranged adjacent the first cam lobe. Similarly, the auxiliary rocker arm is arranged adjacent the first primary rocker arm. According to a further example, an axial distance between the second cam lobe and the first cam lobe matches a distance between a centre plane of the auxiliary rocker arm and a centre plane of the first primary rocker arm (the centre plane being in parallel with a pivoting motion of the respective rocker arm).

According to one example, the auxiliary rocker arm has a free end opposite the end following the second cam lobe, wherein the free end is not adapted to actuate any further valve. According to a further example, the auxiliary rocker arm is arranged in parallel with the first primary rocker arm but while a plane defined by a pivoting motion of the first primary rocker arm matches the first valve, a plane defined by a pivoting motion of the auxiliary rocker arm is not matched to any valve. According to a further example, an engine cylinder is provided with two inlet valves, wherein the plane defined by the pivoting motion of the first primary rocker arm matches a first one of the two inlet valves and wherein the plane defined by a pivoting motion of the auxiliary rocker arm is inbetween the two inlet valves. According to a further example, the plane defined by the pivoting motion of the first primary rocker arm matches a centre point of the first one of the two inlet valves and the plane defined by the pivoting motion of the auxiliary rocker arm is offset in relation to the centre point of the first inlet valve.

According to one embodiment, the first cam lobe and the second cam lobe have different cam profiles. The first cam lobe may be adapted for a main intake event. The second cam lobe may be adapted for extending the main intake event for achieving a Miller operation by varying the relative circumferential positions of the inner shaft and the outer shaft.

According to a further embodiment, the first cam lobe has a symmetrical shape with regard to a peak point of the first cam lobe. Preferably, the first cam lobe has a continuously rounded contour. More specifically, the first cam lobe may have a conventional shape.

According to a further embodiment, the second cam lobe has a non-symmetrical shape with regard to a peak point of the second cam lobe. According to one example, the second cam lobe has a substantially planar profile part in the form of a slope. This design creates conditions for a smooth transition between valve actuation controlled by the first cam lobe and the second cam lobe during operation. According to a further development of the last mentioned example, the substantially planar profile part has a first end and a second end, which are at different lift heights. According to one example, the device is adapted for achieving a smooth transition between valve actuation controlled by the first cam lobe and the second cam lobe, which is described below.

According to a further embodiment, the first cam lobe and the second cam lobe have different maximum lift heights. According to one example, the first cam lobe has a higher maximum lift height than the second cam lobe.

According to a further embodiment, the device comprises a damping arrangement for damping a transition at a transfer point, at which a change of valve opening activation takes place from the first cam lobe to the second cam lobe. Such a damping arrangement creates conditions for a variety of different combinations of cam lobe designs. According to one example, the auxiliary rocker arm comprises at least a part of the damping arrangement. Positioning the damping arrangement in the auxiliary rocker arm creates conditions for a space-efficient device. According to a further example, the damping arrangement comprises a hydraulic circuit. A hydraulic circuit has turned out to be efficient and reliable for valve actuation.

According to a further embodiment, the damping arrangement comprises a first contact member for contacting the first primary rocker arm in order to actuate the first primary rocker arm. Thus, the contact member is adapted to transfer the actuation of the valve from the first primary rocker arm riding on the first cam lobe to the auxiliary rocker arm riding on the second cam lobe. According to one example, the first contact member is moveably arranged in the auxiliary rocker arm. According to a further embodiment, the first contact member is formed by a piston in the hydraulic circuit. Thus, by pressurizing a hydraulic fluid, the piston may be moved to a projected position, in which it will contact the first primary rocker arm and actuate it when the auxiliary rocker arm rides on the second cam lobe.

According to a further embodiment, the first primary rocker arm comprises a first contact portion and the auxiliary rocker arm comprises a second contact portion and wherein the first primary rocker arm and the auxiliary rocker arm are arranged in relation to one another so that the first and second contact portions may be in contact for achieving that the opening time of the first valve is extended by the auxiliary rocker arm following the second cam lobe. Thus, the first contact portion and the second contact portion are arranged so that they face each other for engagement during a relative movement of the first primary rocker arm and the auxiliary rocker arm.

According to a further development of the last mentioned embodiment, the first and second contact portions are in contact with each other when the first primary rocker arm and the auxiliary rocker arm are moved relative to one another in a first direction and wherein the first and second contact portions are free from contact with each other when the first primary rocker arm and the auxiliary rocker arm are moved relative to one another in a second direction, opposite the first direction.

According to a further embodiment, the first moveably arranged contact member comprises the second contact portion.

According to a further embodiment, the first primary rocker arm has a main extension direction in a transverse direction in relation to a rotational axis of the camshaft arrangement, wherein the first primary rocker arm comprises a boss projecting in a transverse direction in relation to the main extension direction and wherein the boss comprises the first contact portion.

According to a further embodiment, the device is arranged so that an opening time of the first valve may be controlled via the second cam lobe by pivoting the inner shaft relative to the outer shaft to different relative circumferential positions.

According to a further embodiment, the device comprises an arrangement for pivoting the inner shaft relative to the outer shaft to different relative circumferential positions and allowing the inner shaft and the outer shaft to rotate with same speed in the different relative circumferential positions. Such a pivoting arrangement may be called a "cam phaser". According to one example, the pivoting arrangement is arranged at one end of the cam shaft arrangement and comprises a hydraulic system for pivoting the shafts relative to one another.

According to a further embodiment, the camshaft arrangement comprises a third cam lobe mounted on the same shaft of the inner shaft and the outer shaft as the first cam lobe in a rotationally fixed manner, wherein the rocker arm arrangement comprises a second primary rocker arm, which is arranged to follow the third cam lobe and arranged to actuate a second valve when it follows the third cam lobe and wherein the auxiliary rocker arm is adapted to actuate the second primary rocker arm so that an opening time of the second valve may be extended by the auxiliary rocker arm following the second cam lobe. Thus, auxiliary rocker arm is adapted to effect both the first primary rocker arm and the second primary rocker arm, which creates conditions for a space-efficient design. Preferably, the device is adapted so that the auxiliary rocker arm effect the first primary rocker arm and the second primary rocker arm simultaneously and in the same way. Thus, in this way, two intake valves of an engine cylinder may be actuated simultaneously and in the same way.

According to a further development of the last mentioned embodiment, the third cam lobe is positioned on an opposite side of the second cam lobe in relation to the first cam lobe. Further, the second primary rocker arm is positioned on an opposite side of the auxiliary rocker arm in relation to the first primary rocker arm.

According to a further example, an engine cylinder is provided with two inlet valves. According to a further example, the second primary rocker arm is arranged in parallel with the first primary rocker arm and at a distance matching the distance between the two inlet valves so that the second primary rocker arm is arranged to actuate the second valve. In other words, a plane defined by a pivoting motion of the second primary rocker arm matches the second valve. According to a further example, the plane defined by the pivoting motion of the second primary rocker arm matches a centre point of the second one of the two inlet valves.

According to a further development of the last mentioned embodiment, the second primary rocker arm has a main extension direction in a transverse direction in relation to a rotational axis of the camshaft arrangement, wherein the second primary rocker arm comprises a boss projecting in a transverse direction in relation to the main extension direction and wherein the boss comprises a third contact portion for contacting the second contact portion of the auxiliary rocker arm. According to one example, the boss of the second primary rocker arm projects in an opposite direction relative to the boss of the first primary rocker arm so that the ends of the bosses meet, preferably with a small gap.

According to a further development of the last mentioned embodiment, the first cam lobe and the third cam lobe are substantially identical.

According to a further embodiment, the rocker arm arrangement comprises a rocker arm shaft and wherein at least one of the rocker arms is pivotally arranged on said shaft.

According to a further embodiment, the rocker arm shaft is arranged in parallel with the camshaft arrangement.

According to a further aspect, the invention is related to an internal combustion engine comprising a cylinder provided with at least one intake valve and at least one exhaust valve and an engine valve actuation device according to any one of the above alternatives for actuating at least one of said valves.

Further advantages and advantageous features of the invention are disclosed in the following description and in the dependent claims.

BRIEF DESCRIPTION OF THE DRAWINGS

With reference to the appended drawings, below follows a more detailed description of embodiments of the invention cited as examples.

In the drawings.

DETAILED DESCRIPTION

Figure 1:
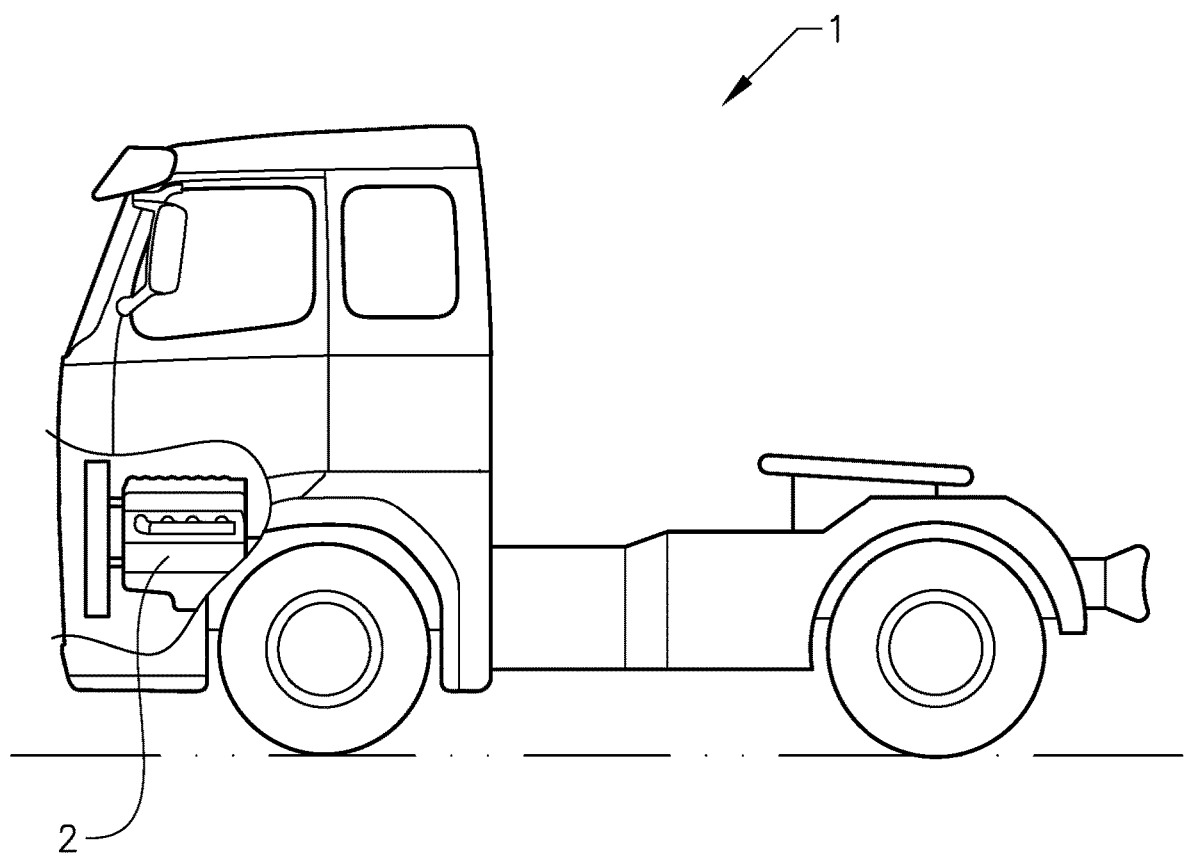
FIG. 1 shows a vehicle in the form of a truck in a partly cut side view.

FIG. 1 shows a vehicle in the form of a truck 1 in a partly cut side view. The truck 1 comprises an internal combustion engine 2 in the form of a diesel engine.

Figure 2:
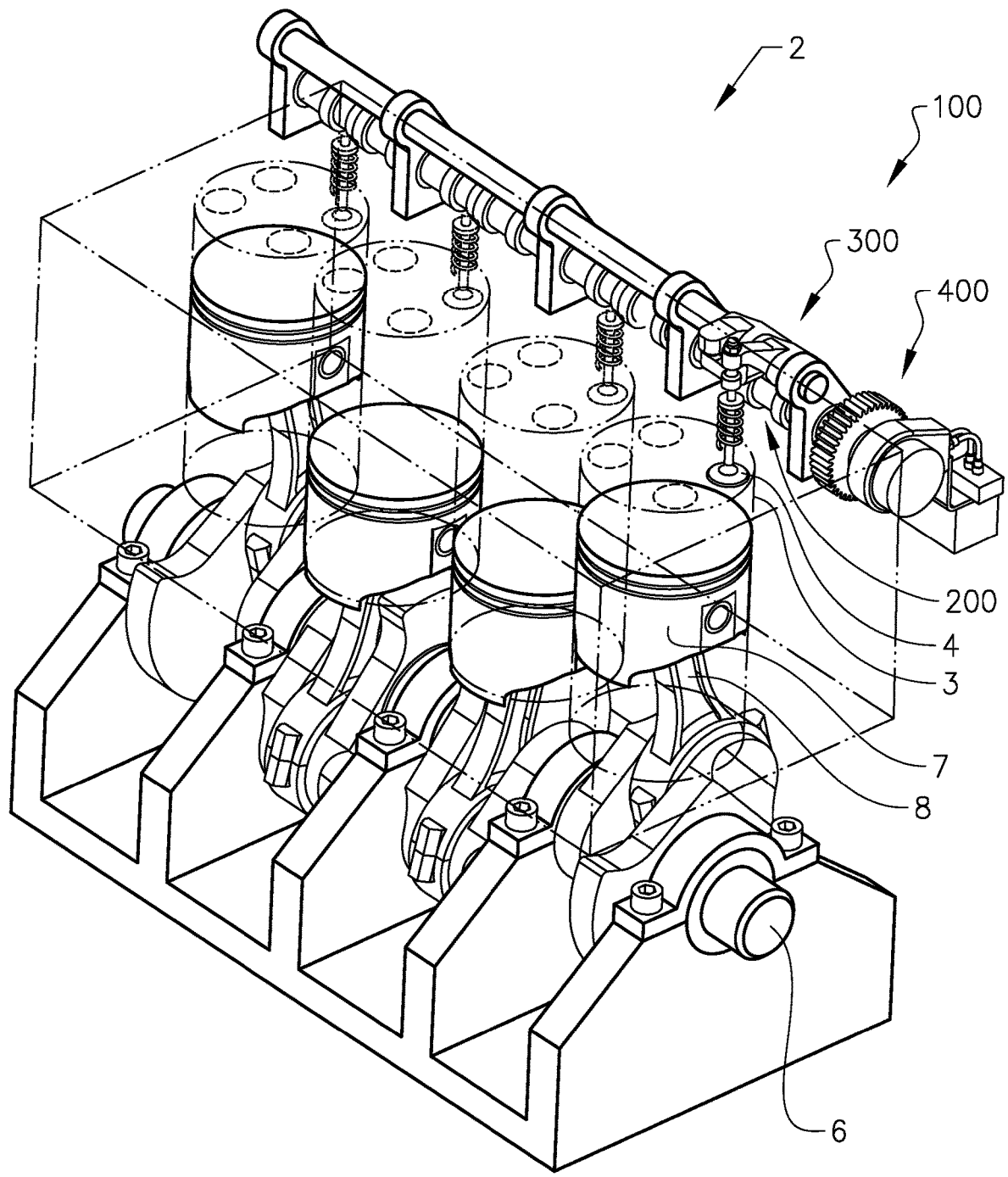
FIG. 2 is a schematic perspective view of a first embodiment of an engine for the truck in FIG. 1, FIG. 3-5 discloses a first embodiment of a camshaft arrangement with concentric camshafts in different views, FIG. 6 discloses a valve lift profile of the camshaft arrangement according to the first embodiment, FIG. 7 discloses the camshaft arrangement according to the first embodiment and a rocker arm arrangement according to a first embodiment in a perspective view, FIG. 8 discloses an auxiliary rocker arm in the rocker arm arrangement according to FIG. 7 in a cross section view, FIG. 9 discloses a first embodiment of an engine valve actuation device comprising the camshaft arrangement and the rocker arm arrangement according to FIG. 7 and a pivoting arrangement according to a first embodiment.

FIG. 2 is a schematic perspective view of a first embodiment of the engine 2. The engine 2 comprises at least one cylinder and in the shown example a plurality of cylinders. More specifically, the engine 2 comprises four cylinders in the shown example. However, the engine may be provided with any number of cylinders, such as six cylinders. The engine 2 comprises a cylinder 3 provided with at least one intake valve 4 and at least one exhaust valve. More specifically, the cylinder is provided with two intake valves 4 and two exhaust valves. Further, the engine 2 comprises a crankshaft 6. The crankshaft 6 is connected to a piston 7 in the cylinder 3 via a connecting rod 8 for transmitting a downward motion of the piston to a rotating motion of the crankshaft. Further, the engine 2 comprises a valve actuation device 100. While the valve actuation device 100 may be used potentially for exhaust valve actuation, a main part of the remainder of this description describes use of the device for intake valve actuation. The valve actuation device 100 comprises a camshaft arrangement 200 with concentric camshafts. The camshaft arrangement 200 is driven by the crankshaft rotation via a transmission (not shown). The valve actuation device 100 further comprises a rocker arm arrangement 300 between the camshaft arrangement 200 and the valves 4,5 for actuating the valves.

The valve actuation device 100 further comprises an arrangement 400 for pivoting an inner shaft relative to an outer shaft in the camshaft arrangement 200 to different relative circumferential positions and allowing the inner shaft and the outer shaft to rotate with same speed in the different relative circumferential positions. The pivoting arrangement 400 is arranged at one end of the cam shaft arrangement 200.

FIGS. 3-5 discloses a first embodiment of the camshaft arrangement 200 with concentric camshafts. More specifically, the camshaft arrangement 200 comprises a hollow outer shaft 202 and an inner shaft 204, which is concentrically mounted inside of the outer shaft 202 to be pivotable relative to the outer shaft between different relative positions. Further, the camshaft arrangement 200 comprises a first cam lobe 206 mounted on the outer shaft 202 in a rotationally fixed manner and a second cam lobe 208 mounted on the inner shaft 204 in a rotationally fixed manner. Here, displacement of the second cam lobe 208 can be realized by means of a non-positive or a frictionally locking connection. In the exemplary embodiment shown, the second cam lobe 208 comprises a tubular circular part 210 projecting from a portion 212 with the active cam lobe surface. The tubular circular part 210 comprises two through holes 214,216 on opposite sides for receipt of a pin 218. Further, the inner shaft 204 comprises a through hole 220, 222 in register with the through holes 214,216 in the tubular circular part. Further, the hollow outer shaft comprises a slot-shaped recess 224,226, which recess extends transversely with respect to the camshaft rotational axis X and in register with the through holes 214,216; 220,222. The pin 218 is fixed at opposite ends in the through holes 214,216 of the tubular circular part 210 and centrally in the through holes 220,222 in the inner shaft 204. Further, the pin 218 is guided in the slot-shaped recess 224,226 in the hollow outer shaft 202.

Figure 6:
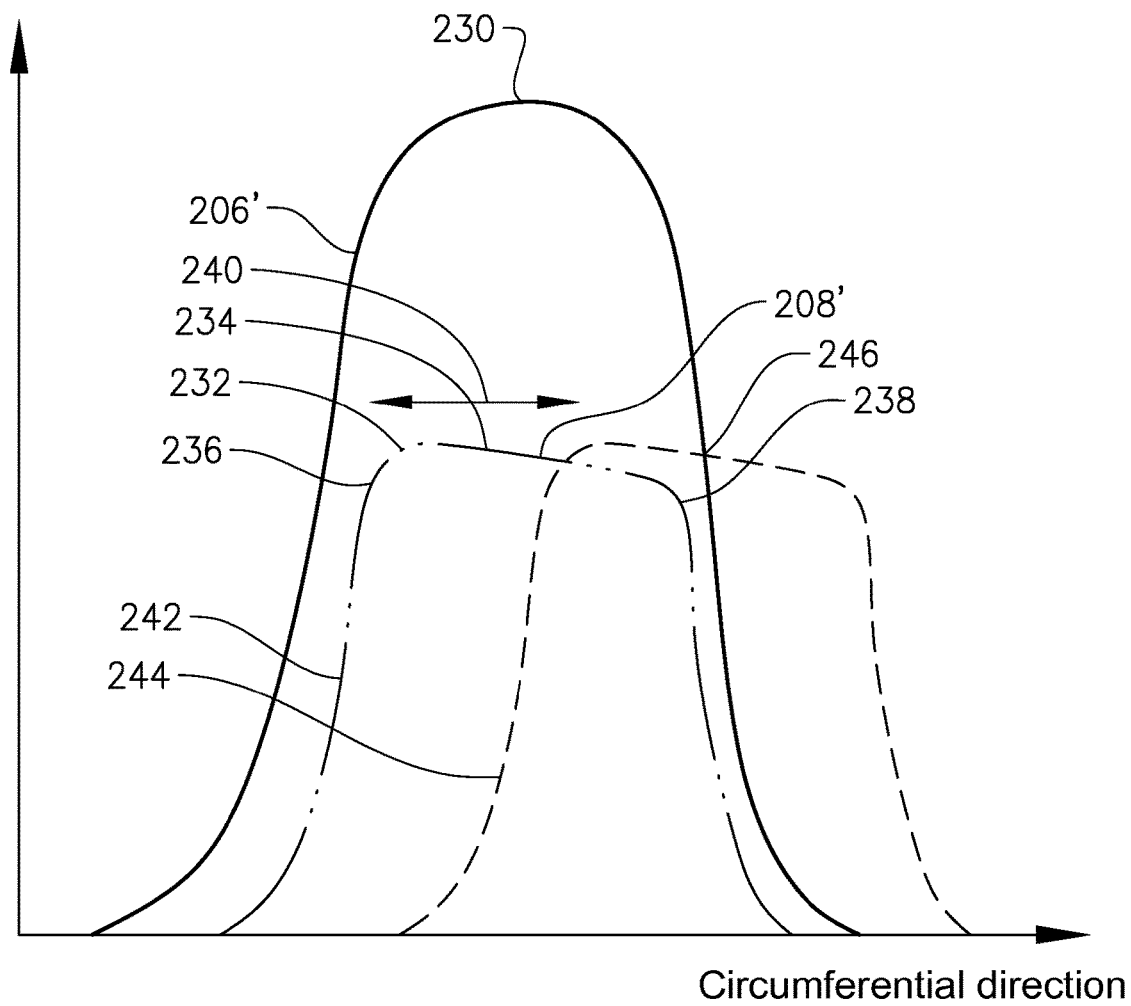

The first cam lobe 206 and the second cam lobe 208 have different cam profiles. FIG. 6 shows the valve lift profile of the camshaft arrangement in a coordinate system, plotted against its circumferential position. A valve lift profile 206' of the first cam lobe 206 has a symmetrical shape with regard to a peak point 230 of the first cam lobe 206. The first cam lobe 206 has a continuously rounded contour. According to one alternative, a top portion of the valve lift profile may be flat.

A valve lift profile 208' of the second cam lobe 208 has a non-symmetrical shape with regard to a peak point 232 of the second cam lobe. More specifically, the second cam lobe 208 has a substantially planar profile part in the form of a slope 234. The substantially planar profile part 234 has a first end 236 and a second end 238, which are at different lift heights (position in radial direction). More specifically, the first end 236 is at an opening side of the cam profile while the second end 238 is at a closing side of the cam profile. Thus, the planar profile part of the second cam lobe 208 is inclined with regard to the rotational angle. Further, the first cam lobe 206 and the second cam lobe 208 have different maximum lift heights. More specifically, the first cam lobe 206 has a higher maximum lift height than the second earn lobe 208. More specifically, the first cam lobe 206 has about twice the maximum lift height of the second cam lobe 208. According to the shown example, both the first end 236 and the second end 238 are positioned in the vicinity of half the maximum lift height of the first cam lobe 206.

Further, FIG. 6 shows two different positions of the second cam lobe 208 relative to the first cam lobe 206 resulting from a pivoting of the inner shaft 204 relative to the outer shaft 202, see arrow 240. A first relative position of the second cam lobe 208 is indicated with a point-dotted line 242 and a second relative position of the second cam lobe 208 is indicated with a dotted line 244.

Figure 7:
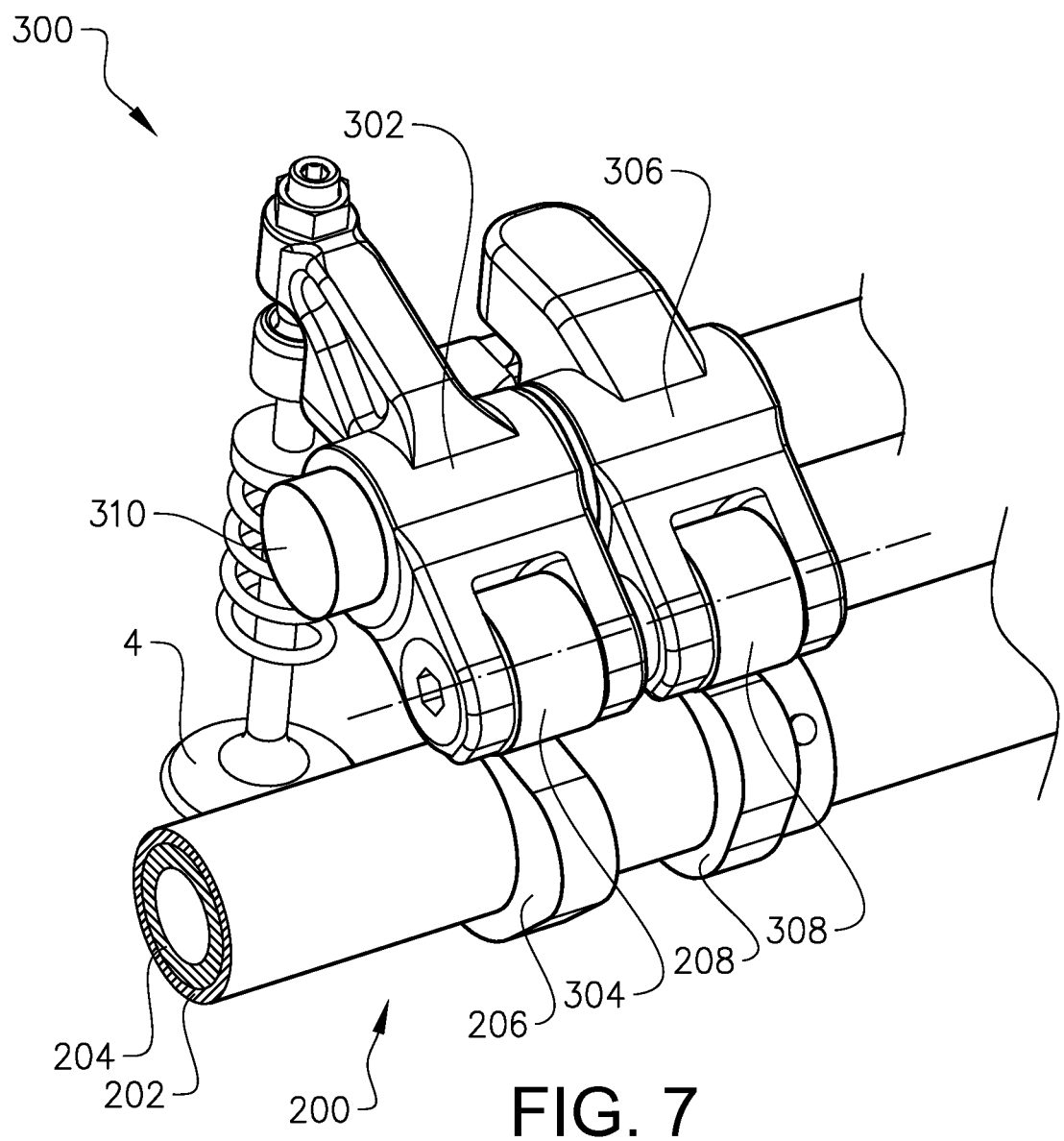

FIG. 7 discloses the camshaft arrangement 200 according to the first embodiment and the rocker arm arrangement 300 according to a first embodiment in a perspective view. The rocker arm arrangement 300 comprises a first primary rocker arm 302, which is arranged to follow the first cam lobe 206 and arranged to actuate the first valve 4 when it follows the first cam lobe 206. The first primary rocker arm 302 comprises a cam roller 304 adapted to contact the first cam lobe 206.

The rocker arm arrangement 300 further comprises an auxiliary rocker arm 306, which is arranged to follow the second cam lobe 208. The auxiliary rocker arm 306 is adapted to actuate the first primary rocker arm 302 so that an opening time of the first valve 4 may be extended by the auxiliary rocker arm 306 following the second cam lobe 208. The auxiliary rocker arm 306 comprises a cam roller 308 adapted to contact the second cam lobe 208.

The rocker arm arrangement 300 further comprises a stationary (non-rotating) rocker arm shaft 310 and wherein said rocker arms 302,306 are pivotally arranged on said shaft 310. The rocker arm shaft 310 is arranged in parallel with the rotational axis X of the camshaft arrangement 200.

Figure 8:
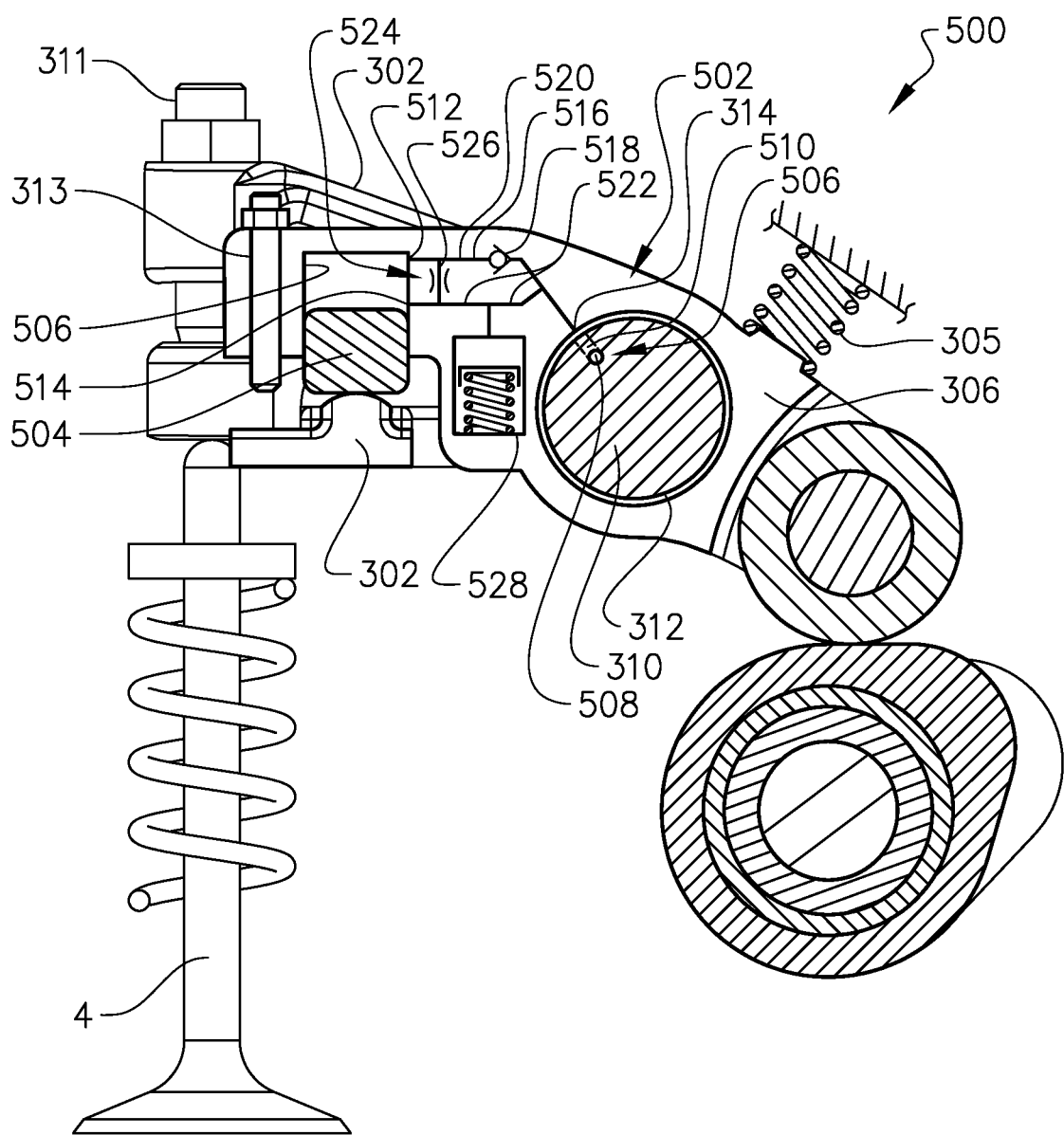

FIG. 8 discloses the auxiliary rocker arm 306 in a cross section view. The engine valve actuation device 100 comprises a damping arrangement 500 for damping a transition at a transfer point 246, see FIG. 6, at which a change of valve opening activation takes place from the first cam lobe 206 to the second cam lobe 208.

The auxiliary rocker arm 306 comprises at least a part of the damping arrangement 500. The damping arrangement 500 comprises a hydraulic circuit 502. The damping arrangement comprises a first contact member 504 for contacting the first primary rocker arm 302 in order to actuate the first primary rocker arm. The first contact member 504 is moveably arranged in the auxiliary rocker arm 306. More specifically, the first contact member 504 is adapted to be hydraulically actuated. More specifically, the first contact member 504 is formed by a piston in the hydraulic circuit 502.

The rocker arm shaft 310 comprises one or more internal passages 506 for the delivery of hydraulic fluid, such as engine oil, to the auxiliary rocker arm 306 mounted thereon. Specifically, the rocker arm shaft 310 comprises a control fluid supply passage 508. The control fluid supply passage 508 is adapted to provide hydraulic fluid to the hydraulic circuit 502 in the auxiliary rocker arm 306 through a rocker shaft passage 510. A solenoid control valve (not shown) may control the supply of low pressure hydraulic fluid to the control fluid supply passage 508.

The auxiliary rocker arm 306 includes a rocker shaft bore 312 extending laterally through a central portion of the auxiliary rocker arm 306. The rocker shaft bore 312 is adapted to receive the rocker arm shaft 310. The rocker shaft bore 312 comprises one or more ports 314 funned in the wall thereof to receive fluid from the control fluid supply passage 508 formed in the rocker arm shaft.

The auxiliary rocker arm 306 comprises a chamber 506 for receipt of the piston 504, wherein the piston 504 is allowed to move back and forth in the chamber 506 in a sliding manner. The chamber 506 is in fluid communication with the port 314 of the rocker shaft bore 312. More specifically, the chamber 506 is in fluid connection with the port 314 of the rocker shaft bore 312 via a first port 512 at an inner closed end of the chamber on a first side of the piston. The chamber 506 is in fluid connection with the port 314 of the rocker shaft bore 312 via a line 516 for the hydraulic fluid. More specifically, the damping chamber 506 comprises two ports 512,514, wherein a second port 514 has a direct connection to the port 314 of the rocker shaft bore. The oil can flow without any restriction in both directions via the second port 514. The damping piston 504 is adapted to be pressed into the damping chamber 314 by the first primary rocker arm 302 during operation.

The hydraulic circuit 502 comprises a check valve 518. The first port 512 in the damping chamber 506 is connected to the port 314 of the rocker shaft bore 312 via the check valve 518 in an open direction. The hydraulic circuit 502 comprises a first line 520 arranged between the first port 512 and the port 314 of the rocker shaft bore 312 and a second line 522 arranged between the second port 514 and the port 314 of the rocker shaft bore 312. Further, the hydraulic circuit 502 comprises a flow restriction 524. The flow restriction 524 is arranged on a line 526 connecting the first line 520 and the second line 522. When the damping piston 504 is in inner part of damping chamber 506, overlapping and thereby blocking the second port 514, and moving inwards, the remaining oil has to pass the flow restriction 524 (as check valve 518 is closed). This oil flow restriction cause the damping piston 504 to have a relative low velocity versus damping chamber 506. This damping arrangement 500 is adapted to avoid severe impact forces between the first primary rocker arm 302 and the auxiliary rocker arm 306.

Further, the hydraulic circuit 502 may optionally comprise an oil accumulator 528 in order to reduce requirement on oil supply capacity. The oil accumulator 528 is in fluid communication with the second line 522.

An adjustment screw 311 is indicated for adjustment of a relative distance between the primary rocker arm 302 and the valve 4. The adjustment screw 311 is arranged in a bore in the primary rocker arm 302, which bore extends in parallel with the valve opening direction.

In addition to what is shown in FIG. 7, an adjustment screw 313 is indicated for adjustment of a relative distance between the auxiliary rocker arm 306 and the primary rocker arm 302. The adjustment screw 313 is arranged in a bore in the auxiliary rocker arm 306, which bore extends in parallel with a movement direction of the piston 504.

Further, in addition to what is shown in FIG. 7, a spring 305 is indicated for biasing the auxiliary rocker arm 306 into contact with the second cam lobe 208.

Figure 9:
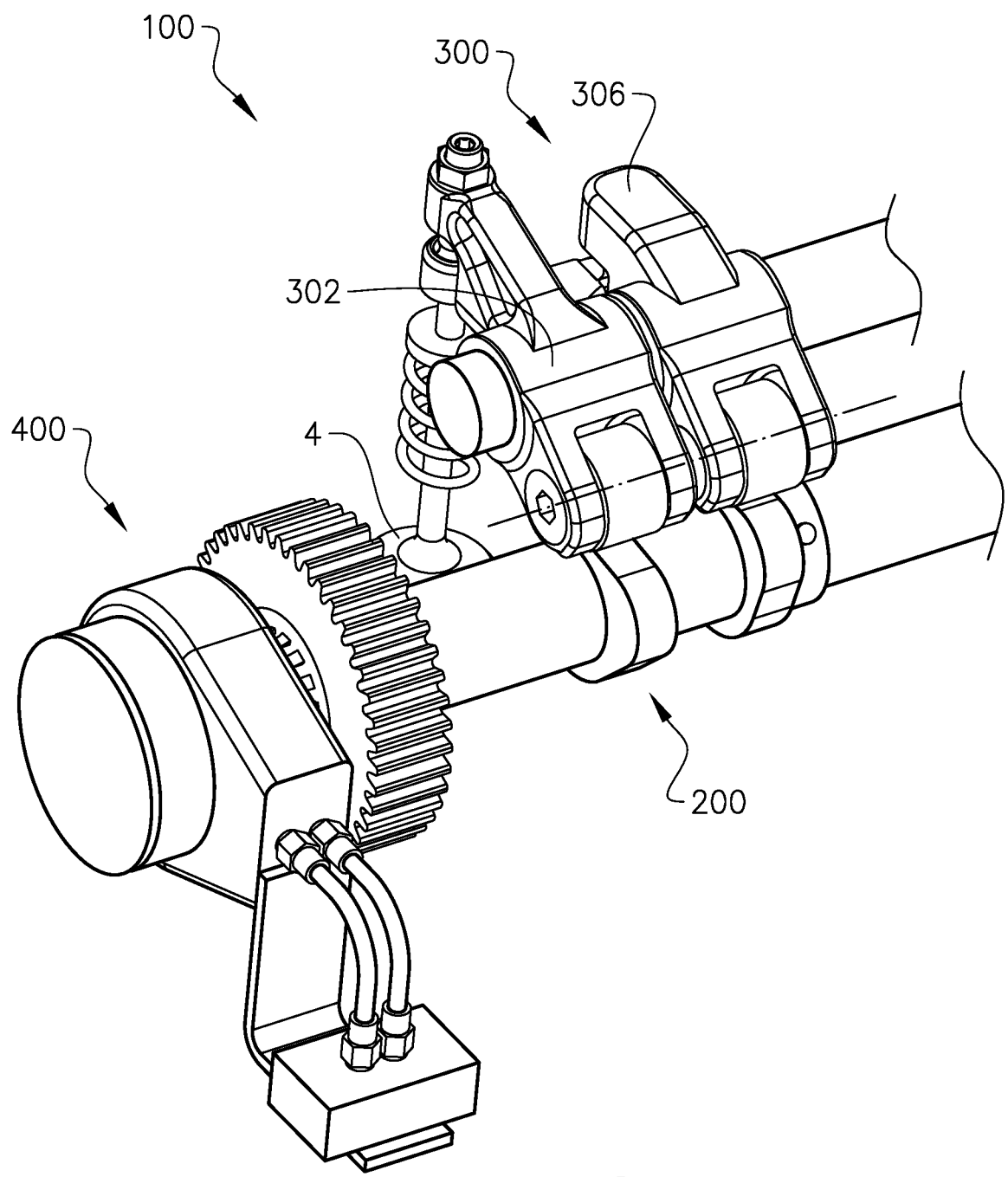

FIG. 9 discloses a first embodiment of an engine valve actuation device 100 comprising the camshaft arrangement 200 and the rocker arm arrangement 300 according to FIG. 7 and the pivoting arrangement 400 according to a first embodiment.

Figure 10:
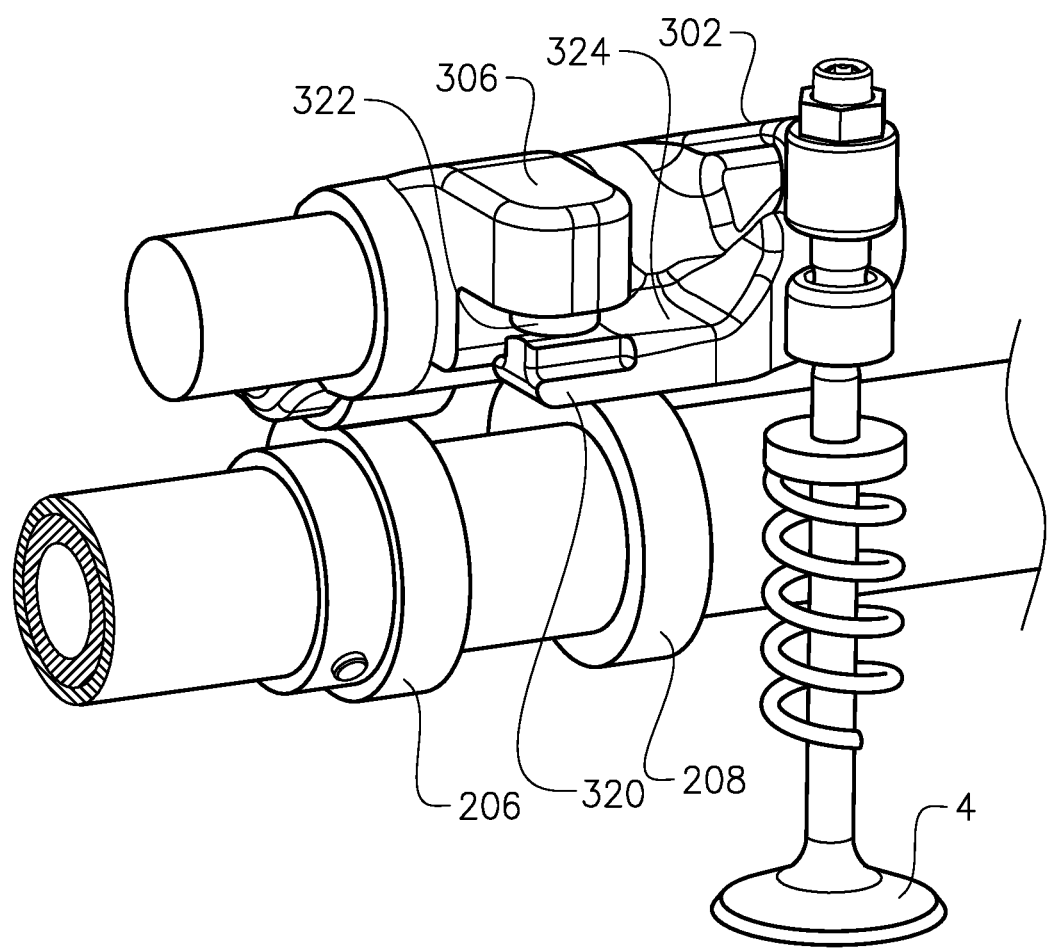
FIG. 10 discloses the camshaft arrangement and the rocker arm arrangement according to FIG. 7 in a perspective view from the other side, FIG. 11-14 discloses the pivoting arrangement according to FIG. 10 in different views, FIG. 15-21 discloses a second embodiment of an engine valve actuation device, and FIG. 22 discloses a valve lift profile of the camshaft arrangement according to an alternative embodiment.

FIG. 10 shows the camshaft arrangement 200 and the rocker arm arrangement 300 according to FIG. 7 in a perspective view from the other side. Especially, FIG. 10 discloses the interaction between the first primary rocker arm 302 and the auxiliary rocker area 306. The first primary rocker arm 302 comprises a first contact portion 320 and the auxiliary rocker arm 306 comprises a second contact portion 322. The first primary rocker arm 302 and the auxiliary rocker arm 306 are arranged in relation to one another so that the first and second contact portions 320,322 may be in contact for achieving that the opening time of the first valve 4 is extended by the auxiliary rocker arm 306 following the second cam lobe 208.

More specifically, the device 100 is adapted so that the first and second contact portions 320,322 are in contact with each other when the first primary rocker arm 302 and the auxiliary rocker arm 306 are moved relative to one another in a first direction while the first and second contact portions 320,322 are free from contact with each other when the first primary rocker arm 302 and the auxiliary rocker arm 306 are moved relative to one another in a second direction, opposite the first direction.

The first moveably arranged contact member 504 (the damping piston in the hydraulic circuit 502) comprises the second contact portion 322.

The first primary rocker arm 302 has a main extension direction in a transverse direction in relation to the rotational axis X of the camshaft arrangement 200, wherein the first primary rocker arm 302 comprises a boss 324 projecting in a transverse direction in relation to the main extension direction and wherein the boss 324 comprises the first contact portion 320.

According to one example, a transmission element in the form of a cog wheel is rigidly attached to one of the shafts in the camshaft arrangement 200 for transferring a rotational movement from the crankshaft 6 to the camshaft arrangement 200.

Figure 11:
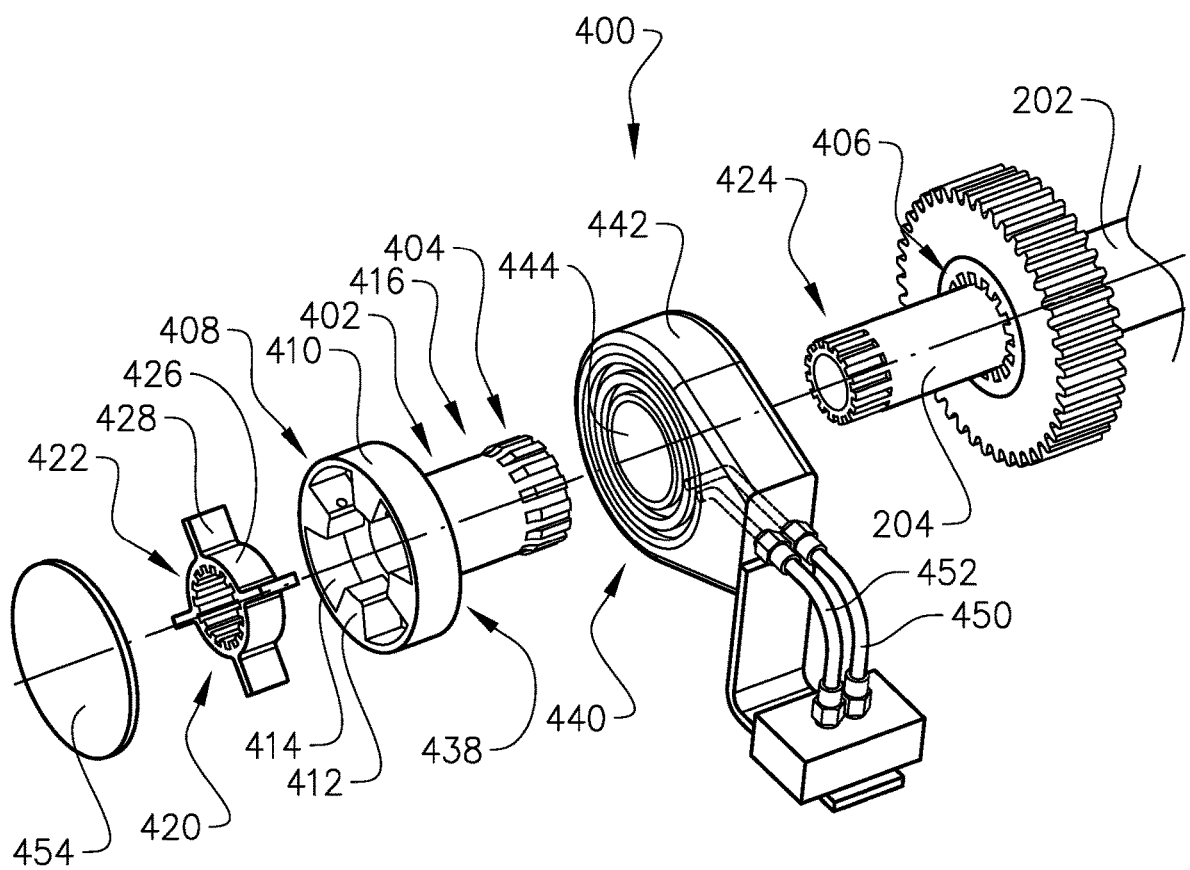

FIG. 11 shows the pivoting arrangement 400 in an exploded view. The pivoting arrangement 400 is adapted to be hydraulically actuated. The pivoting arrangement 400 comprises a first part 402 adapted to be rotationally rigidly connected to the outer shaft via a spline connection 404,406. The first part 402 comprises a first section 408 with an outer circular wall 410 and a plurality of circumferentially spaced walls 412 extending inwards from the outer wall in a radial direction of the first part 402. A free end of the circumferentially spaced walls 412 is positioned at a distance from a rotational axis, wherein a central space is formed. A plurality of circumferentially spaced chambers 414 is defined between the outer circular wall 410 and the circumferentially spaced walls 412. The first part 402 comprises a second, tubular section 416 concentrically arranged relative to the outer circular wall 410 and rotationally rigidly connected to the first section 408 at one end. The second, tubular section 416 comprises the spline connection 404 at the other, opposite end.

Further, the pivoting arrangement 400 comprises a second part 420 adapted to be rotationally rigidly connected to the inner shaft 204 via a spline connection 422,424. The second part 420 comprises an inner circular wall 428 and a plurality of circumferentially spaced walls 428 extending outwards from the inner wall 426 in a radial direction of the second part. The second part 420 is adapted to be fitted inside of the first part 402 (in the central space) so that the circumferentially spaced walls 428 of the second part 420 are received in the chambers 414 of the first part. More specifically, the circumferentially spaced walk 428 of the second part 420 has a substantially smaller extension in the circumferential direction than the chambers 414 of the first part 402 thereby allowing a relative pivoting between the first part 402 and the second part 420 in an engaged state. More specifically, the circumferential extension of the chamber 414 in relation to the circumferential extension of the wall 428 defines end positions for said pivoting movement.

Figure 12:
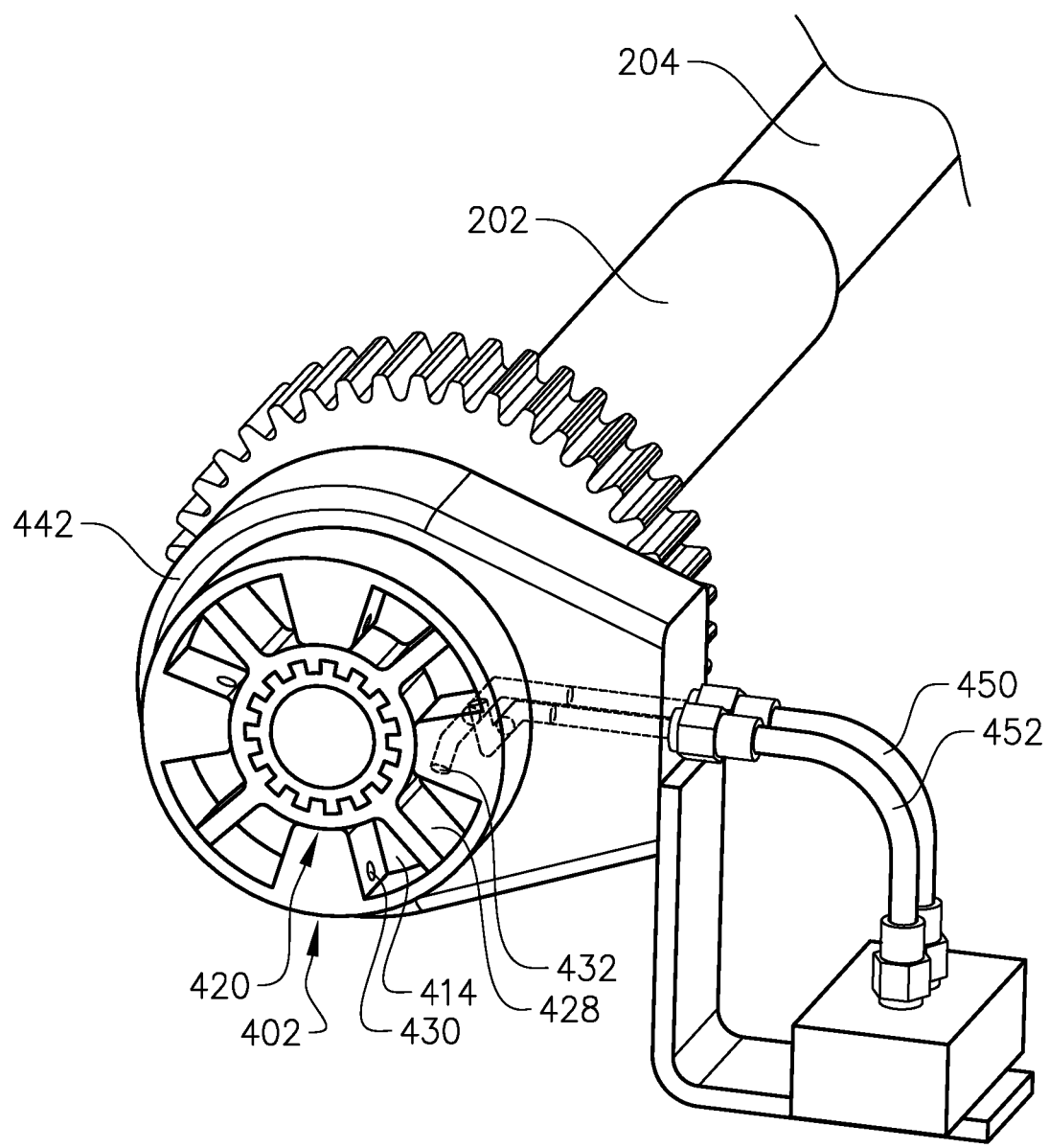

Turning now to FIG. 12, the first part 402 comprises a first port 430 and second port 432 for an actuation fluid to each one of said chambers 414, wherein the ports are arranged on opposite sides of the chamber in the circumferential direction. Preferably, the first and second ports 430,432 are provided on adjacent walls. The first and second ports 430,432 are adapted to be in fluid communication with a source (not shown) of actuation fluid allowing the chamber to be pressurized from any side. In this way, the actuation fluid may act on the circumferentially spaced walls 428 of second part 420 and thereby pivot the second part 420 relative to the first part 402.

Figure 13:
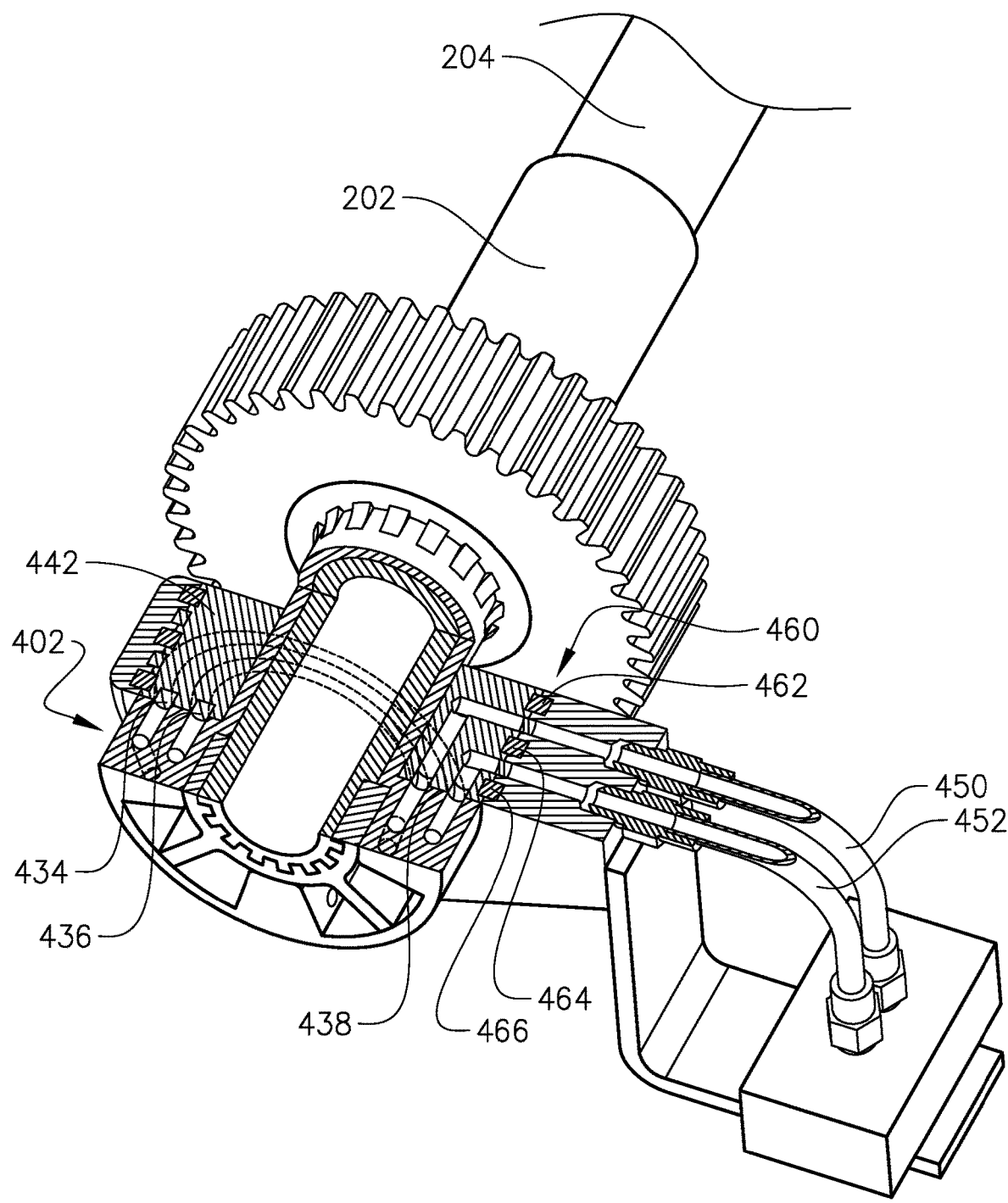
Figure 14:
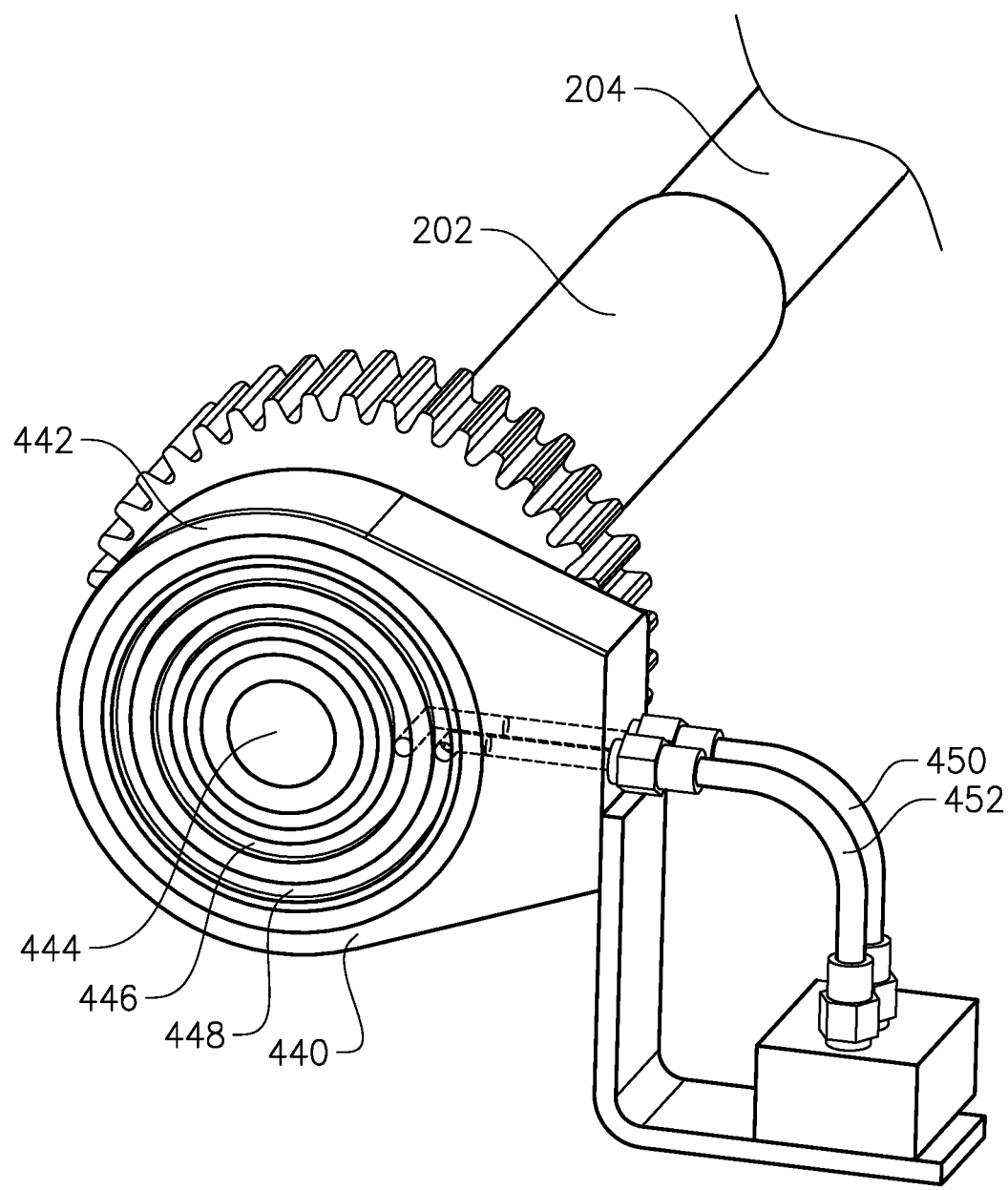

Turning now to FIG. 13, the first part 402 comprises a third port 434 in fluid communication with the first port 430 and a fourth port 436 in fluid communication with the second port. The third port 434 and the fourth port 436 are provided in the first section 408 of the first part and open in as axial direction towards the second section 416. More specifically, third port 434 and the fourth port 436 are provided on different radial distances. More specifically, the first section comprises a contact surface 438 facing in an axial direction for contacting a correspondingly shaped contact surface 440 of a housing 442 and the third and fourth ports are provided in the contact surface. More specifically, the contact surface 438 extends in a plane transverse to an axial direction of the first part and preferably in a plane perpendicular to the axial direction.

Further, the pivoting arrangement comprises the housing 442 for receipt of the first part 402. More specifically, the housing 442 comprises a circular opening 444 for receipt of the second, tubular section 416 of the first part 402. Further, the housing 442 comprises two radially spaced circular grooves 446,448 in the contact surface 440 facing in an axial direction. More specifically, the contact surface 440 extends in a plane transverse to an axial direction of the housing 442 and preferably in a plane perpendicular to the axial direction. The two radially spaced circular grooves 446,448 are concentric with the circular opening 444. Further, each one of the two radially spaced circular grooves 446,448 are matched with regard to size and position to one of the third and fourth port 434,436 for establishing a fluid communication in an operational state. Further, each one of the two radially spaced circular (grooves 446,448 are in fluid communication with a fluid line 450,452.

Further, the housing 442 comprises a sealing arrangement 460 for sealing between the circular opening 444 and the second, tubular section 416 of the first part 402. The sealing arrangement 460 comprises the three circular sealings 462, 464,466. Each one of the two lines 450,452 providing the ports 434 and 436 with fluid is arranged between two adjacent sealings 462,464,466.

Further, the pivoting arrangement 400 comprises a cover 454 on an opposite side of the first and second part relative to the housing for closing the chambers in an axial direction.

Figure 15:
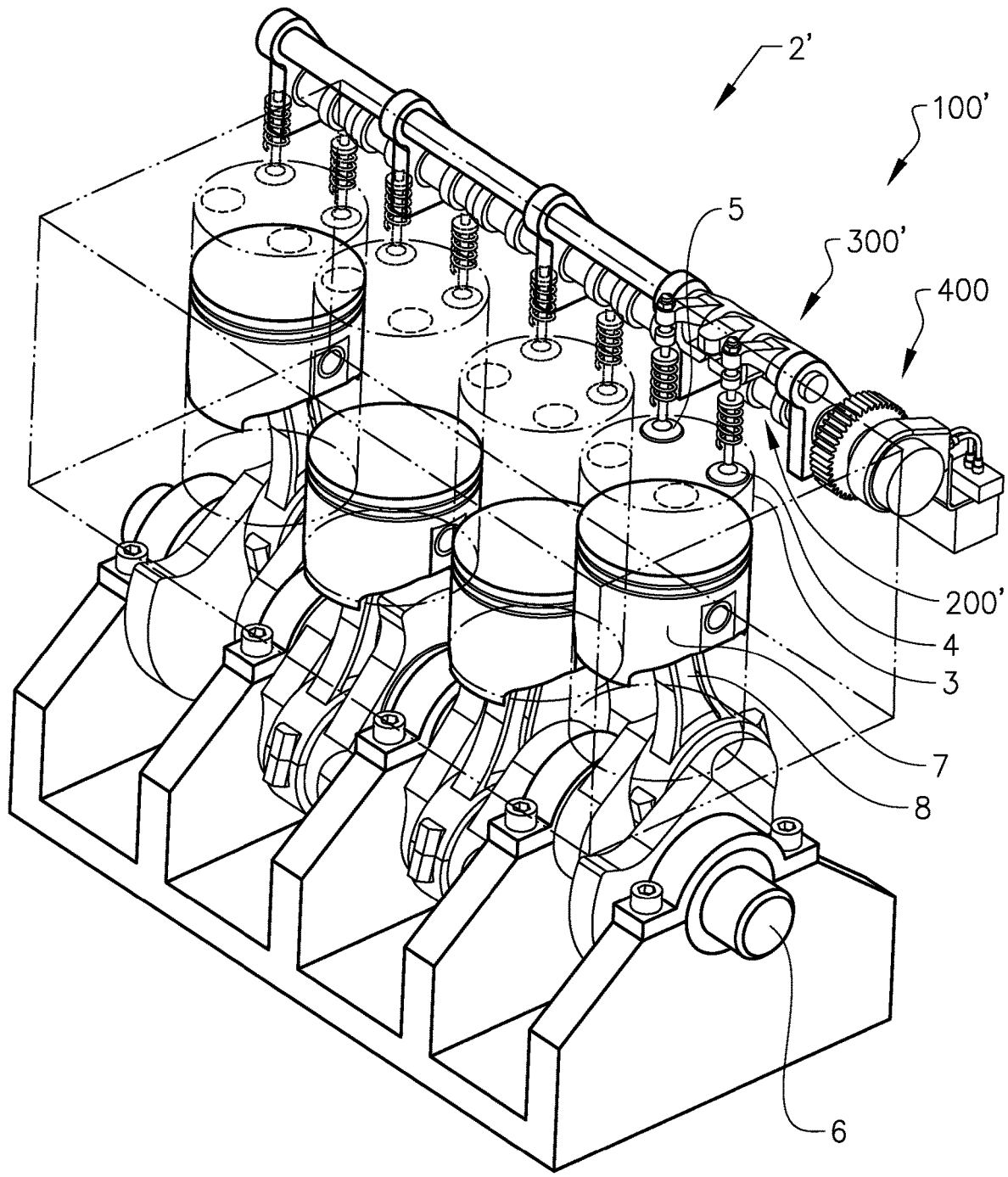

FIG. 15 is a schematic perspective view of a second embodiment of the engine 2'. In the following, for ease of presentation, only the differences in relation to the first embodiment (FIG. 1-14) will be described below. More specifically, FIG. 15 discloses an engine valve actuation device 100' according to a second embodiment and a camshaft arrangement 200' according to a second embodiment.

The camshaft arrangement 200' is disclosed in FIG. 16-18 corresponding to FIGS. 2-5. The camshaft arrangement 200' comprises a third cam lobe 209 mounted on the outer shaft 202 in a rotationally fixed manner. The third cam lobe 209 is positioned on an opposite side of the second cam lobe 208 in relation to the first cam lobe 206. The third cam lobe 209 is preferably substantially identical to the first cam lobe 206 in size and shape. According to one example, the two main rocker arms contact the damping arrangement 500 simultaneously.

Figure 19:
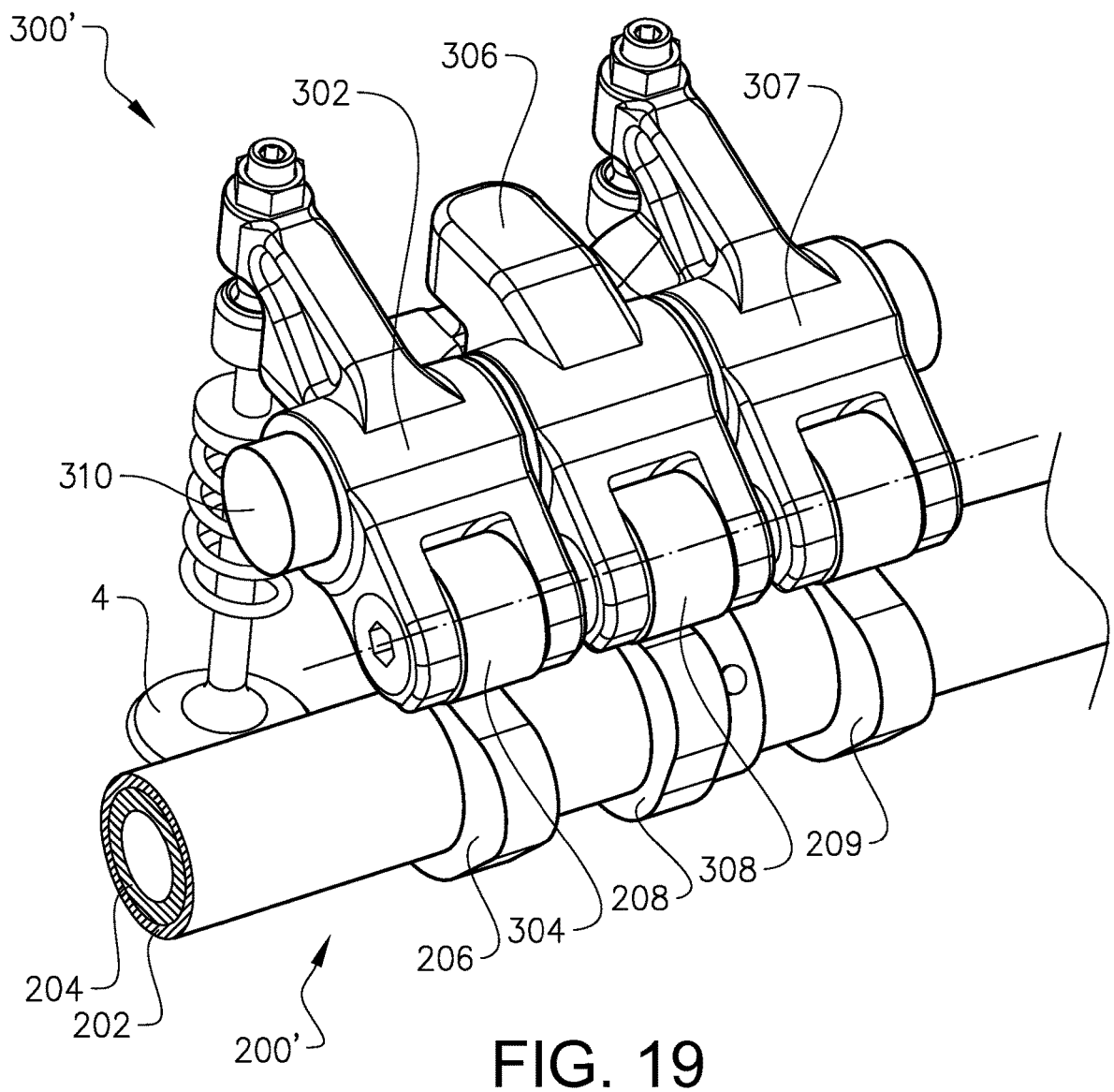
Figure 20:
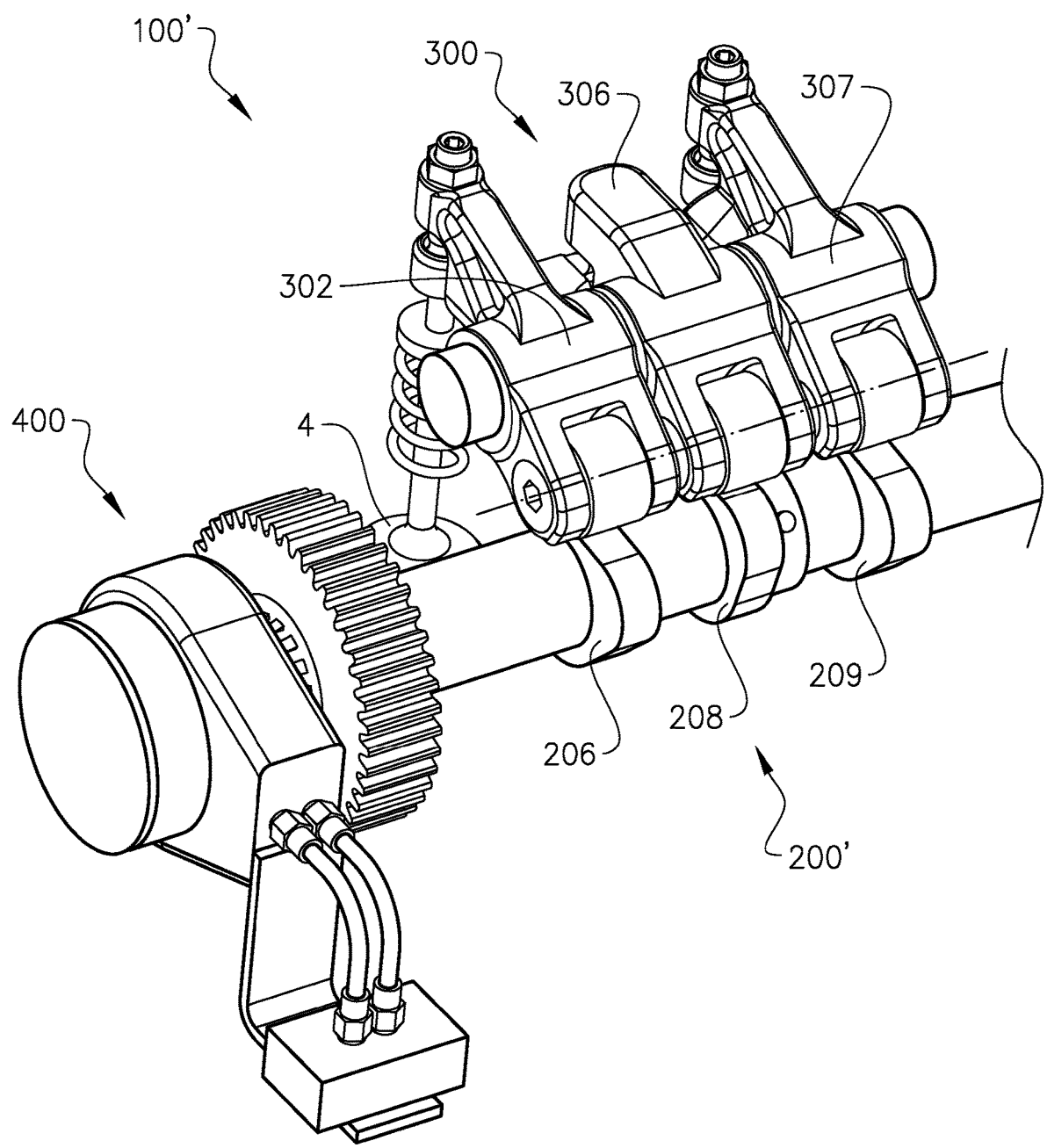

The rocker arm arrangement 300' is disclosed in FIG. 19 corresponding to FIG. 7. The rocker arm arrangement 300' comprises a second primary rocker arm 307, which is arranged to follow the third cam lobe 209 and arranged to actuate a second valve 5 when it follows the second cam lobe 209. The second primary rocker arm 307 comprises a cam roller 309 adapted to contact the third cam lobe 209. The auxiliary rocker arm 306 is adapted to actuate the second primary rocker arm 307 so that an opening time of the second valve 5 may be extended by the auxiliary rocker arm 306 following the second cam lobe 208. The second primary rocker arm 307 is positioned on an opposite side of the auxiliary rocker arm 306 in relation to the first primary rocker arm 302.

Figure 21:
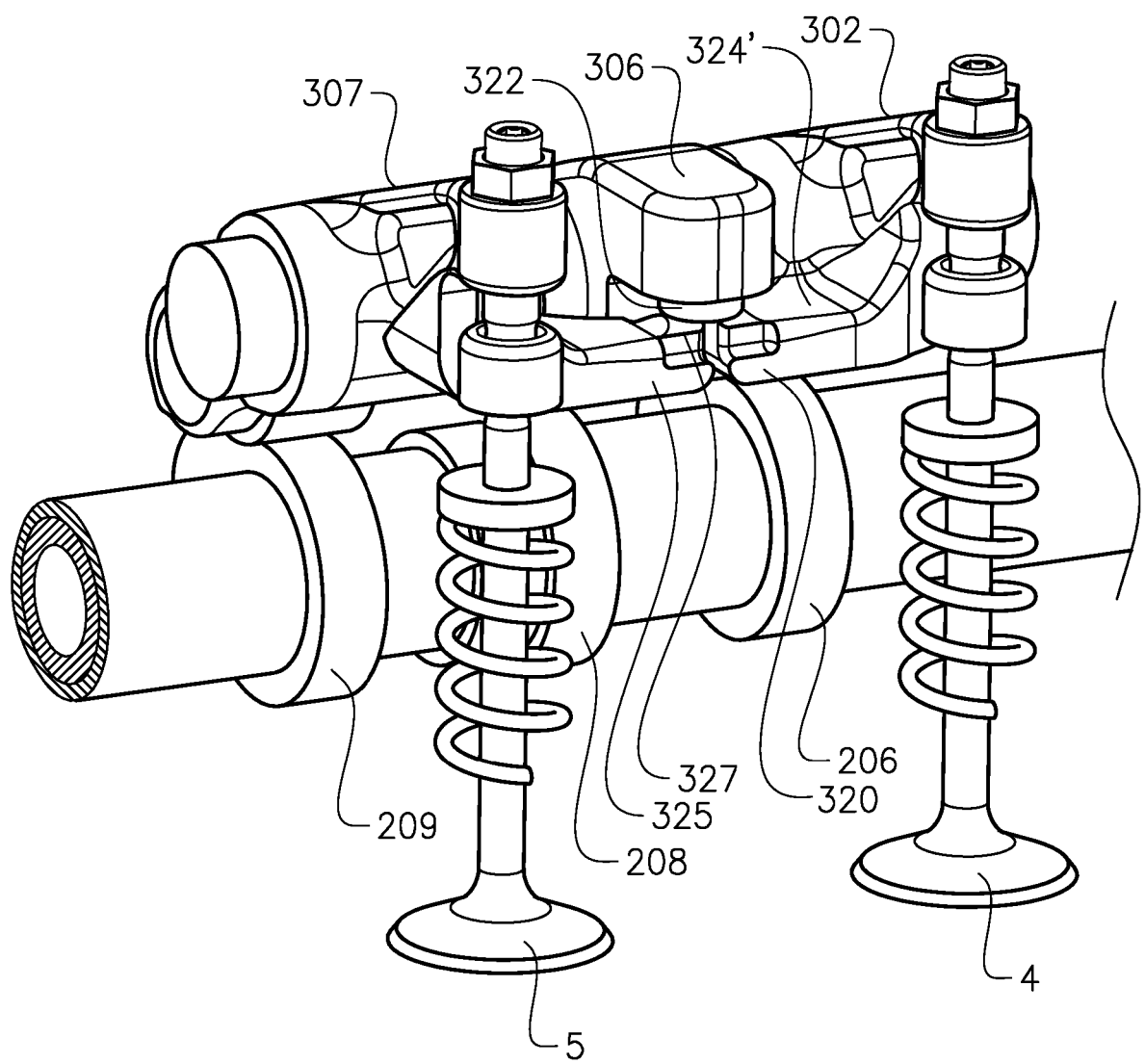

Turning now to FIG. 21, the second primary rocker arm 307 has a main extension direction in a transverse direction in relation to a rotational axis of the camshaft arrangement 200', wherein the second primary rocker arm 307 comprises a boss 325 projecting in a transverse direction in relation to the main extension direction. The boss 325 comprises a third contact portion 327 for contacting the second contact portion 322 of the auxiliary rocker arm 306. The boss 324' of the first primary rocker arm 302 has a somewhat shorter extension in the second embodiment relation to the first embodiment for making room for the boss 325 of the second primary rocker arm 307 to also contact the second contact portion 322 of the auxiliary rocker arm 306. More specifically, the boss 324' of the first primary rocker arm 302 and the boss 325 of the second primary rocker arm 307 are directed towards each other. More specifically, the boss 324' of the first primary rocker arm 302 and the boss 325 of the second primary rocker arm 307 are mirrored in relation to one another in a centre plane of the auxiliary rocker arm 306. More specifically, the boss 324' of the first primary rocker arm 302 and the boss 325 of the second primary rocker arm 307 have such extensions that there is a small gap formed inbetween.

Figure 22:
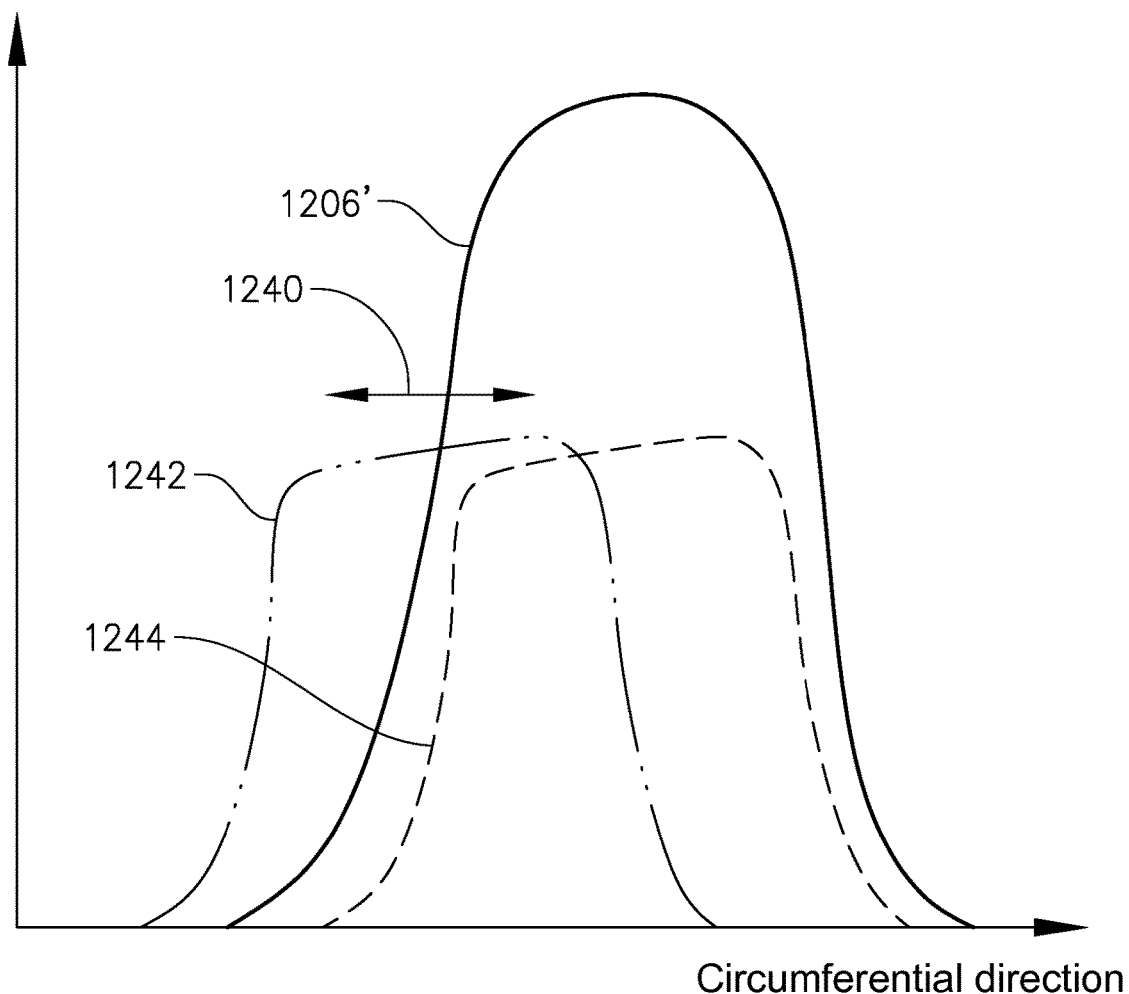

FIG. 22 discloses a valve lift profile of the camshaft arrangement according to an alternative embodiment. Only the main difference in relation to the above embodiments will be described. More specifically, FIG. 22 discloses a solution where, instead of an extension of the valve opening time for late closing of the valve, there is an extension of the valve opening time via a pre-opening of the valve. The pre-opening of the valve is achieved by a phase shift of the first (and third) cam lobe in relation to the second cam lobe so that the valve may be actuated by the first (and third) cam lobe before the second cam lobe. FIG. 22 shows a valve lift profile 1206' of the second cam lobe and a valve lift profile 1242 of the first (and third) cam lobe. More specifically, FIG. 22 shows two different positions of the first (and third) cam lobe relative to the second cam lobe resulting from a pivoting of the inner shaft relative to the outer shaft, see arrow 1240. A first relative position of the first (and third) cam lobe is indicated with a point-dotted line 1242 and a second relative position of the first (and third) cam lobe is indicated with a dotted line 1244. The valve lift profile of the first (and third) cam lobe is in FIG. 22 mirrored in relation to the valve lift profile of the second cam lobe in FIG. 6 for a smooth transition from the first (and third) cam lobe to the second cam lobe during operation. According to one example, this alternative embodiment may be used for exhaust valve actuation.

It is to be understood that the present invention is not limited to the embodiments described above and illustrated in the drawings; rather, the skilled person will recognize that many changes and modifications may be made within the scope of the appended claims.

According to one example, the cam profiles of the cam lobes may be different from what has been shown in FIG. 6. Especially, the profile of the second cam lobe may have a different design and/or lift height. For example, the profile of the second cam lobe may have a symmetrical and rounded shape.

According to a further example, instead of the auxiliary rocker arm comprising the damping arrangement, the first (or second) primary rocker arm may comprise the damping arrangement. In such a solution, the auxiliary rocker arm would comprise a boss projecting in a transverse direction in relation to its main extension direction and wherein the boss comprises a contact portion for engagement with a piston in the hydraulic circuit of the primary rocker arm.

According to a further example, the rocker arm arrangement according to the first embodiment (FIG. 7) may be duplicated for actuation of a second valve. This would create conditions for using different opening intervals for the two valves. It would further require an additional set of cam lobes in the camshaft arrangement.

The invention claimed is:

1. A device for actuating at least one valve in an internal combustion engine, wherein the device comprises a camshaft arrangement comprising
a hollow outer shaft,
an inner shaft, which is concentrically mounted inside of the outer shaft to be pivotable relative to the outer shaft,
a first cam lobe mounted on one of the inner shaft and the outer shaft in a rotationally fixed manner,
a second cam lobe mounted on an other one of the inner shaft and the outer shaft than the first cam lobe in a rotationally fixed manner,
a rocker arm arrangement comprising
a first primary rocker arm, which is arranged to follow the first cam lobe and arranged to actuate a first valve when it follows the first cam lobe,
an auxiliary rocker arm, which is arranged to follow the second cam lobe and that the auxiliary rocker arm is adapted to actuate the first primary rocker arm so that an opening time of the first valve is arranged to selectively be extended by the auxiliary rocker arm following the second cam lobe, wherein
the first cam lobe and the second cam lobe have different cam profiles, and in that the device comprises a damper for damping a transition at a transfer point, at which a change of valve opening actuation takes place between the first cam lobe and the second cam lobe, for achieving a smooth transition between valve actuation controlled by the first cam lobe and the second cam lobe.

2. A device according to claim 1, wherein the first cam lobe has a symmetrical shape with regard to a peak point of the first cam lobe.

3. A device according to claim 1, wherein the first cam lobe has a continuously rounded contour.

4. A device according to claim 1, wherein the second cam lobe has a non symmetrical shape with regard to a peak point of the second cam lobe.

5. A device according to claim 1, wherein the second cam lobe has a substantially planar profile part.

6. A device according to claim 5, wherein the substantially planar profile part has a first end and a second end, which are at different lift heights.

7. A device according to claim 1, wherein the first cam lobe and the second cam lobe have different maximum lift heights.

8. A device according to claim 1, wherein the first cam lobe has a higher maximum lift height than the second cam lobe.

9. A device according to claim 1, wherein the damper comprises a hydraulic circuit.

10. A device according to claim 9, wherein a first one of the auxiliary rocker arm and the first primary rocker arm comprises at least a part of the damper, the damper comprises a first contact member for contacting a second one of the auxiliary rocker arm and the first primary rocker arm in order to actuate it, the first contact member is moveably arranged in the first one of the auxiliary rocker arm and the first primary rocker arm, and wherein the first contact member is formed by a piston in the hydraulic circuit.

11. A device according to claim 1, wherein a first one of the auxiliary rocker arm and the first primary rocker arm comprises at least a part of the damper.

12. A device according to claim 11, wherein the damper comprises a first contact member for contacting a second one of the auxiliary rocker arm and the first primary rocker arm in order to actuate it.

13. A device according to claim 12, wherein the first contact member is moveably arranged in the first one of the auxiliary rocker arm and the first primary rocker arm.

14. A device according to claim 1, wherein the first primary rocker arm comprises a first contact portion and the auxiliary rocker arm comprises a second contact portion and wherein the first primary rocker arm and the auxiliary rocker arm are arranged in relation to one another so that the first and second contact portions is arranged to selectively be in contact for achieving that the opening time of the first valve is extended by the auxiliary rocker arm following the second cam lobe.

15. A device according to claim 14, wherein the device is adapted so that the first and second contact portions are in contact with each other when the first primary rocker arm and the auxiliary rocker arm are moved relative to one another in a first direction and wherein the first and second contact portions are free from contact with each other when the first primary rocker arm and the auxiliary rocker arm are moved relative to one another in a second direction, opposite the first direction.

16. A device according to claim 14, wherein the first primary rocker arm has a main extension direction in a transverse direction in relation to a rotational axis of the camshaft arrangement, wherein the first primary rocker arm comprises a boss projecting in a transverse direction in relation to the main extension direction and wherein the boss comprises the first contact portion.

17. A device according to claim 14, wherein the camshaft arrangement comprises a third cam lobe mounted on the same shaft of the inner shaft and the outer shaft as the first cam lobe in a rotationally fixed manner, wherein the rocker arm arrangement comprises a second primary rocker arm, which is arranged to follow the third cam lobe and arranged to actuate a second valve when it follows the third cam lobe, the auxiliary rocker arm is adapted to actuate the second primary rocker arm so that an opening time of the second valve maybe extended by the auxiliary rocker arm following the second cam lobe, the second primary rocker arm is positioned on an opposite side of the auxiliary rocker arm in relation to the first primary rocker arm, wherein the second primary rocker arm has a main extension direction in a transverse direction in relation to a rotational axis of the camshaft arrangement, wherein the second primary rocker arm comprises a boss (325) projecting in a transverse direction in relation to the main extension direction, and wherein the boss comprises a third contact portion for contacting the second contact portion of the auxiliary rocker arm.

18. A device according to claim 12, wherein the first primary rocker arm comprises a first contact portion and the auxiliary rocker arm comprises a second contact portion and wherein the first primary rocker arm and the auxiliary rocker arm are arranged in relation to one another so that the first and second contact portions is arranged to selectively be in contact for achieving that the opening time of the first valve is extended by the auxiliary rocker arm following the second cam lobe, and wherein the first contact member comprises the second contact portion.

19. A device according to claim 1, wherein the device is arranged so that the opening time of the first valve is arranged to selectively be controlled via the second cam lobe by pivoting the inner shaft relative to the outer shaft to different relative circumferential positions.

20. A device according to claim 1, wherein the device is arranged so the inner shaft is pivotable relative to the outer shaft to different relative circumferential positions and allowing the inner shaft and the outer shaft to rotate with same speed in the different relative circumferential positions.

21. A device according to claim 1, wherein the camshaft arrangement comprises a third cam lobe mounted on a same shaft of the inner shaft and the outer shaft as the first cam lobe in a rotationally fixed manner, wherein the rocker arm arrangement comprises a second primary rocker arm, which is arranged to follow the third cam lobe and arranged to actuate a second valve when it follows the third cam lobe and wherein the auxiliary rocker arm is adapted to actuate the second primary rocker arm so that an opening time of the second valve may be extended by the auxiliary rocker arm following the second cam lobe.

22. A device according to claim 21, wherein the third cam lobe is positioned on an opposite side of the second cam lobe in relation to the first cam lobe.

23. A device according to claim 21, wherein the second primary rocker arm is positioned on an opposite side of the auxiliary rocker arm in relation to the first primary rocker arm.

24. A device according to claim 21, wherein the first cam lobe and the third cam lobe are substantially identical.

25. A device according to claim 1, wherein the rocker arm arrangement comprises a rocker arm shaft and wherein at least one of the first primary rocker arm and the auxiliary rocker arm is pivotally arranged on the shaft.

26. A device according to claim 25, wherein the rocker arm shaft is arranged in parallel with the camshaft arrangement.

27. A device according to claim 1, wherein the device is adapted for actuating at least one intake valve.

28. An internal combustion engine comprising a cylinder provided with at least one intake valve and at least one exhaust valve and an engine valve actuation device according to claim 1 for actuating at least one of the at least one intake valve and the at least one exhaust valve.

* * * * *